United States Patent
Chandler et al.

(10) Patent No.: US 12,467,847 B2
(45) Date of Patent: Nov. 11, 2025

(54) COMPACT FLOW CYTOMETER AND METHOD OF USE

(71) Applicant: Emission Inc., Georgetown, TX (US)

(72) Inventors: Van S. Chandler, Georgetown, TX (US); Glenn T. Chandler, Georgetown, TX (US)

(73) Assignee: Emission Inc., Georgetown, TX (US)

( * ) Notice: Subject to any disclaimer, the term of this patent is extended or adjusted under 35 U.S.C. 154(b) by 337 days.

(21) Appl. No.: 18/024,009

(22) PCT Filed: Aug. 31, 2021

(86) PCT No.: PCT/US2021/048558
§ 371 (c)(1),
(2) Date: Feb. 28, 2023

(87) PCT Pub. No.: WO2022/051309
PCT Pub. Date: Mar. 10, 2022

(65) Prior Publication Data
US 2023/0266226 A1    Aug. 24, 2023

Related U.S. Application Data

(60) Provisional application No. 63/182,500, filed on Apr. 30, 2021, provisional application No. 63/073,225, filed on Sep. 1, 2020.

(51) Int. Cl.
*G01N 15/1434* (2024.01)
*G01N 15/1404* (2024.01)
(Continued)

(52) U.S. Cl.
CPC ..... *G01N 15/1434* (2013.01); *G01N 15/1404* (2013.01); *G01N 2015/1006* (2013.01); *G01N 15/1409* (2024.01)

(58) Field of Classification Search
CPC ........... G01N 15/1434; G01N 15/1404; G01N 15/1409; G01N 2015/1006
See application file for complete search history.

(56) References Cited

U.S. PATENT DOCUMENTS 5,872,627 A * 2/1999 Miers ................. G01N 15/1431
356/338
5,981,180 A   11/1999 Chandler et al.
(Continued)

FOREIGN PATENT DOCUMENTS

| EP | 1 521 076 A1 | 4/2005 | |
|---|---|---|---|
| EP | 3465226 B1 * | 4/2021 | ......... G01N 15/1404 |
| WO | WO-2010005617 A2 * | 1/2010 | ........ B01L 3/502715 |

OTHER PUBLICATIONS

International Search Report and Written Opinion for International Application No. PCT/US2021/048558 mailing date Dec. 7, 2021, 16 pages.

*Primary Examiner* — David P Porta
*Assistant Examiner* — Fani Polyzos Boosalis
(74) *Attorney, Agent, or Firm* — Wolf, Greenfield & Sacks, P.C.

(57) ABSTRACT

A compact flow instrument for multiplexed analysis of a pooled population of subsets of particles exposed to a sample includes an examination zone with one or more examination compartments for irradiating a passing particle with electromagnetic radiation (EMR), one or more EMR sources for irradiating the passing particle, one or more detectors configured to detect EMR emitted or scattered by the passing particle, a syringe pump driven by a stepper motor to deliver sheath fluid in characteristic pulses according to each step of the stepper motor for transporting the passing particle, and a controller. The controller is configured to actuate the syringe pump to deliver sheath fluid to transport the passing particle, capture the detected EMR at (Continued)

a rate commensurate with the velocity of the transported particle as it passes through the examination zone, and compile information about the captured EMR.

40 Claims, 13 Drawing Sheets

(51) Int. Cl.
    *G01N 15/10*           (2006.01)
    *G01N 15/1409*      (2024.01)

(56) References Cited

U.S. PATENT DOCUMENTS

| | | | |
|---|---|---|---|
| 11,534,089 B2* | 12/2022 | Taub | G01N 33/48792 |
| 12,135,270 B2* | 11/2024 | Klas | B01L 3/502761 |
| 2006/0232780 A1 | 10/2006 | King | |
| 2009/0068062 A1* | 3/2009 | Jafari | G01N 1/38 |
| | | | 436/179 |

* cited by examiner

COMPACT FLOW CYTOMETER AND METHOD OF USE

CROSS-REFERENCE TO RELATED APPLICATIONS

This application is the U.S. National Stage of International Patent Application No. PCT/US2021/048558, filed Aug. 31, 2021, which claims the benefit of and priority to U.S. Provisional Patent Application No. 63/182,500, filed Apr. 30, 2021, and U.S. Provisional Patent Application No. 63/073,225, filed Sep. 1, 2020, the entire disclosures of each of which are incorporated herein by reference.

BACKGROUND

The present disclosure relates generally to flow cytometry and, more specifically, to a system and methods for driving sheath fluid through a flow cytometer.

Flow cytometry is an optical technique that analyzes particular particles in a fluid mixture based on the particles' optical characteristics using an instrument known as a flow cytometer (i.e., a flow instrument). Background information on flow cytometry may be found in Shapiro, H. (2003), "Practical Flow Cytometry," Fourth Ed. (John Wiley & Sons); and Melamed et al. (1991), "Flow Cytometry and Sorting," Second Ed. (Wiley-Liss), which are incorporated herein by reference in their entireties. Existing flow cytometry devices suffer from various challenges, such as inaccurate measurements due to pressure fluctuations and/or designs that require large and costly equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
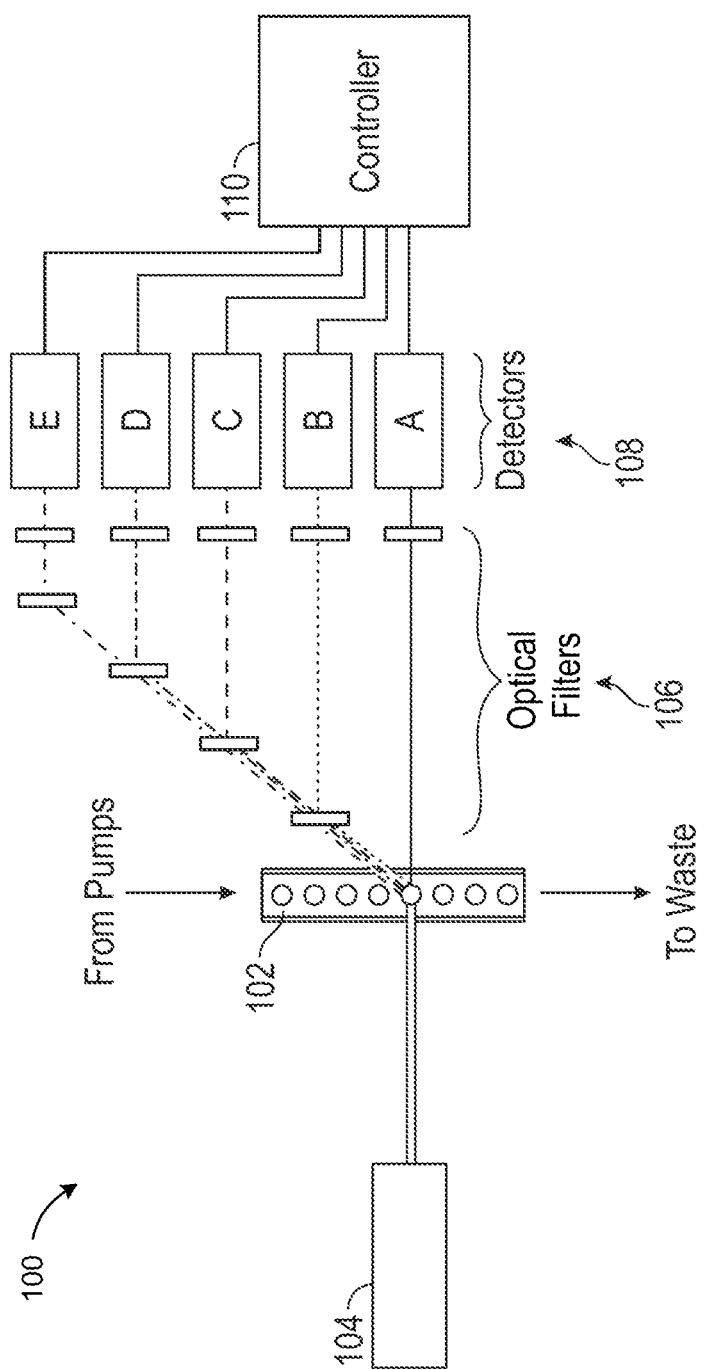
FIG. 1 is a high-level diagram of a flow cytometry system, according to some embodiments.

Referring generally to the FIGURES, systems and methods for flow cytometry are is shown that utilize a plurality of syringe pumps to drive sheath fluid through an examination zone, according to example embodiments.

A flow cytometer or flow instrument hydrodynamically focuses a fluid suspension of particles into a thin stream so that the particles flow in substantially single file and pass through an examination zone. A focused light beam, such as a laser beam, illuminates the particles as they flow through the examination zone. Optical detectors within the flow cytometer measure certain characteristics of the light as it interacts with the particles. In general, flow cytometers can measure forward light scatter (generally correlated with the refractive index and size of the particle being illuminated), side light scatter (generally correlated with the particle's size), and particle fluorescence at one or more wavelengths. Fluorescence is typically imparted by incorporating or attaching a fluorochrome within the particle. In other words, particles of interest within a sample may be fluorescently dyed prior to mixing with a suitable sheath fluid.

Some systems may include an air pressurized vessel of fluid to order to drive a sample of interest though a flow cell (e.g., to focus the fluid suspension of particles), in order to maintain a constant pressure and, therefore, a constant speed of the particles. While high frequency oscillations in particle speed are minimized through the use of a pressurized vessel, measurements over long time periods can suffer due to pressure fluctuations. For example, as the vessel transitions from full to near empty, the sheath pressure decreases while the air pressure within the vessel remains constant. Consequently, samples processed (i.e., measured) when the vessel is full (e.g., of fluid) may exhibit less fluorescence than other samples processed when the vessel is near empty and the slower particles spend more time in the beam. Additionally, an air pressurized sheath fluid systems can be considerably large and expensive.

According to some implementations, a flow cytometer or flow instrument can include a control system with a controller communicably coupled to electronic components of the flow cytometer. The controller operates motors and actuators of a plurality of pumps, at least one valve, a sample tray, and a probe arm, in order to collect a sample (e.g., of fluorescently dyed particles suspended in a solution) and to drive the sample along with a sheath fluid through an examination zone. Particles of the sample are irradiated by one or more lasers as they pass through the examination zone, and data regarding various characteristics of the particles is collected from emissions of the particles.

Unlike other flow cytometer designs, the flow cytometer and corresponding systems described herein utilize a plurality of positive displacement pumps to move the sample and the sheath fluid throughout the system. In some embodiments, the flow cytometer includes at least three syringe pumps operated by stepper motors. Syringe pumps provide a number of advantages over other sheath fluid delivery systems, including decreased size and cost, instant or nearly-instant speed variations (e.g., of the sheath fluid), and more constant and controllable pressure. Additionally, syringe pumps are able to temporarily increase sheath fluid pressure to prevent, eliminate, and/or dislodge clogs (i.e., biological materials blocking the flow cell or other fluid paths). Additional features and advantages of the present disclosure are described in greater detail below.

Turning first to FIG. 1, a high-level diagram of a flow cytometry system 100 is shown, according to some embodiments. System 100 may represent any flow cytometry system or flow cytometer (i.e., flow instrument) that utilizes one or more positive displacement pumps to drive a sheath fluid and/or to move a sample for testing. In some embodiments, system 100 is a flow cytometer that utilizes a plurality of syringe pumps to drive sheath fluid and to collect samples. It will be appreciated that the specific components, and arrangement of components shown in FIG. 1 is not intended to be limiting, and that similar components and layout could be utilized in a flow cytometry system such as system 100.

In operation, one or more samples containing cells or particles suspended in a fluid are injected into a flow cell 102 (e.g., a cuvette). In some embodiments, samples are made up of a plurality of fluorescently dyed particles or cells ("FDPs") in a single-cell suspension. The sample may be "picked-up" or retrieved using a sample probe, for example, and driven (e.g., by a pump) to flow cell 102. In some embodiments, system 100 may include multiple of flow cells depending on the specific application of the flow cytometer. While entering flow cell 102, the sample may be introduced to a slightly faster-moving sheath fluid (e.g., driven by a second pump). The sheath fluid may be any suitable fluid, such as a saline solution or even water (e.g., de-ionized water), that is used to force the sample is small, "core" stream. In other words, the sheath fluid may hydrodynamically focus the particles of the sample into the core stream, so that the particles travel in single-file line along a similar axis and at a similar velocity as the sheath fluid. To achieve the hydrodynamic focusing of the particles, the sheath fluid may be driven in such a manner as to maintain laminar flow.

Flow cell 102 generally constitutes an examination zone where the passing particles, being carried by a sheath fluid, are irradiated by a light source 104. In certain embodiments, the examination zone, and thereby flow cell 102, may include one or more examination compartments. Each of these examination compartments may be dedicated to irradiating the passing particles with a particle wavelength or wavelength range of electromagnetic radiation (EMR), or light. In some embodiments, light source 104 is any type of high or low-power laser, although light source 104 may also be a suitable lamp (e.g., mercury, xenon) depending on a particular implementation. In some cases, light source 104 includes multiple lamps or lasers that may emit various different wavelengths. Light scattering results when a particle deflects incident light from light source 104.

The light scatter, or emissions, from an irradiated particle may pass through a plurality of optical filters 106 that manipulate the emissions (i.e., light) in various ways. For example, the emissions may be focused or reflected at an angle by optical filters 106, and/or certain wavelengths of light may be blocked or omitted for greater measurement accuracy. In some embodiments, as shown, optical filters 106 may include reflectors that angle the light towards a detector or sensor. A series of detectors 108 may detect the light or emissions. Subsequently, data from detectors 108 may be transmitted to a controller 110 for further processing.

Figure 2:
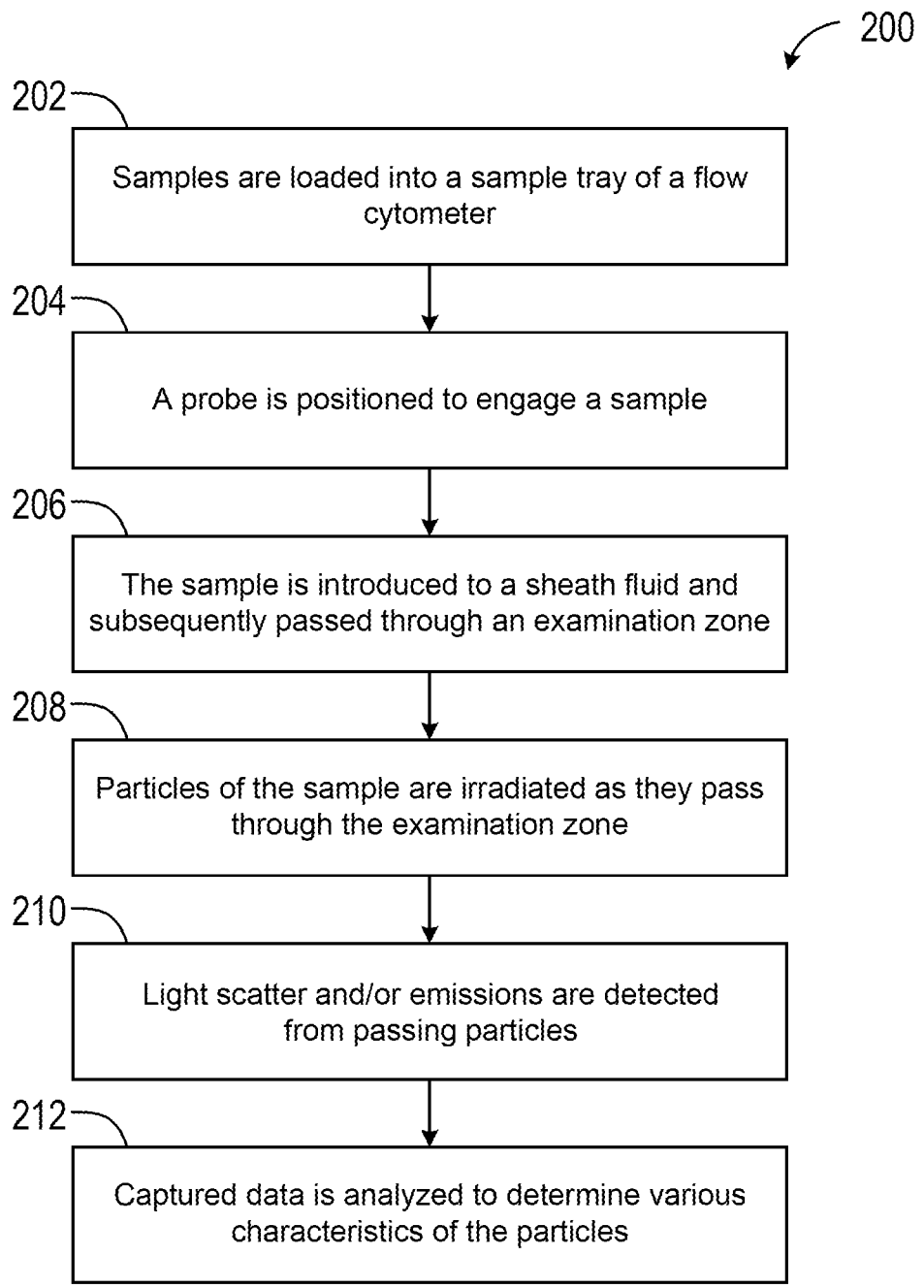
FIG. 2 is a flowchart of a process for analyzing sample particles using the flow cytometry system of FIG. 1, according to some embodiments.

Referring now to FIG. 2, a flowchart of a process 200 for analyzing sample particles using flow cytometry system 100 is shown, according to some embodiments. Process 200 may be implemented by system 100, for example. Accordingly, FIG. 2 may illustrate more specific steps that are taken in the testing of a sample via a flow cytometer such as system 100. It will be appreciated that certain steps of process 200 may be optional and, in some embodiments, process 200 may be implemented using less than all of the steps and/or different steps than are shown in FIG. 2.

At step 202, samples are loaded into a sample tray of the flow cytometer. The samples, as indicated above, are generally single-cell or single-particle suspension containing a number of particles to be analyzed. In some cases, particles of interest are coated or dyed with a fluorescent compound by any well-known means. In other words, the particles of a sample may be dyed with one or more fluorescent dyes prior to testing. Individual samples may be contained within Eppendorf tubes, or another similar vessel. One or more of said Eppendorf tubes or vessels may then be placed into an assay microplate or other similar apparatus for holding the samples. The microplate containing the samples, or even a single tube containing a sample, may then be placed into position within the flow cytometer.

At step 204, a sample probe is positioned (e.g., maneuvered) to engage at least one sample from the sample tray. In some embodiments, the sample probe may be positioned using one or more actuators, motors, and/or gears, which allow the sample probe and/or a sample probe arm to move in one or more planes. In other embodiments, the sample probe may be manually positioned to engage a sample. In any case, the sample probe may be inserted into a particular sample (e.g., into an Eppendorf tube containing a sample) so that the sample may be retrieved (e.g., via suction) for analysis.

At step 206, the sample is transferred towards a flow cell, where the sample is introduced to a sheath fluid. In some embodiments, the sample is driven via a positive displacement pump, such as a syringe pump, along a length of tubing (i.e., hose) to an inlet of the flow cell. Simultaneously, a sheath fluid is transferred (e.g., via a second pump) to the flow cell. As described briefly above, the sheath fluid is forced through the flow cell and the sample is introduced (i.e., injected) into the sheath fluid stream in order to focus the sample into the center (i.e., core) of the sheath fluid stream. This acts to hydrodynamically focus the particles of the sample into a single line within the sheath fluid core. The transfer of the sample and the sheath fluid is described in greater detail below, with respect to FIGS. 5A-5C.

At step 208, the particles of the sample, being transported by the sheath fluid through the examination zone, are irradiated. More specifically, a particle passing through the examination zone is irradiated by an EMR or light source, typically one or more lasers, and at step 210 EMR (i.e., light) scattering and/or emissions (e.g., fluorescence) from the irradiated particle are detected. The light scattering and/or emissions may be detected by one or more sensors (e.g., photosensors), for example. In some cases, at least forward-scattered and side-scattered light are detected by sensors placed in parallel and/or perpendicular to the examination zone. Additionally, one or more sensors may capture fluorescence patterns from the emissions of the particle. In some embodiments, fluorescent emission intensity is defined by a capture of a number of photons having wavelengths falling within a predetermined band. Generally, these detectors and/or sensors convert detected light and emissions signals into electronic signals that can be processed by a controller or computer.

At step 212, the captured light scatter and/or emissions data, herein generally referred to as "emissions data," is analyzed to determine various particle characteristics. The emissions data may be received for analysis by a controller (e.g., controller 110) or any other suitable processing unit or computer system (e.g., a server) that can be communicably coupled to the sensors and detectors. The controller may interpret the received data and/or preprocess the data, such as by normalizing or modifying a type of the data, and may perform a variety of analyses to determine various particle characteristics. Generally, the emissions data may be utilized to determine at least a size, a granularity, and fluorescence pattern of a sample particle.

With respect to FIG. 1, for example, a first detector A may be a forward-scattered light detector configured to measure diffracted light just off the axis of the incident light (e.g., light source 104) beam and dispersed in a forward direction. The forward-scattered light may be proportional to the surface area or size of a particle. In the same example, detector B may be a side-scattered light detector, configured to detect refracted and reflected light that occurs at any interface within the particle where there is a change in the refractive index. The side-scattered light may indicate a particle's granularity or the internal complexity of a cell. Each of detectors C-E may be configured to detect fluorescence of a passing fluorescently dyed particle (FDP) to identify additional characteristics of the particle. Accordingly, each of detectors C-E and accompanying optical filters 106 may be configured to interact with (e.g., reflect, filter, detect) a particle range of wavelengths of light.

Figure 3:
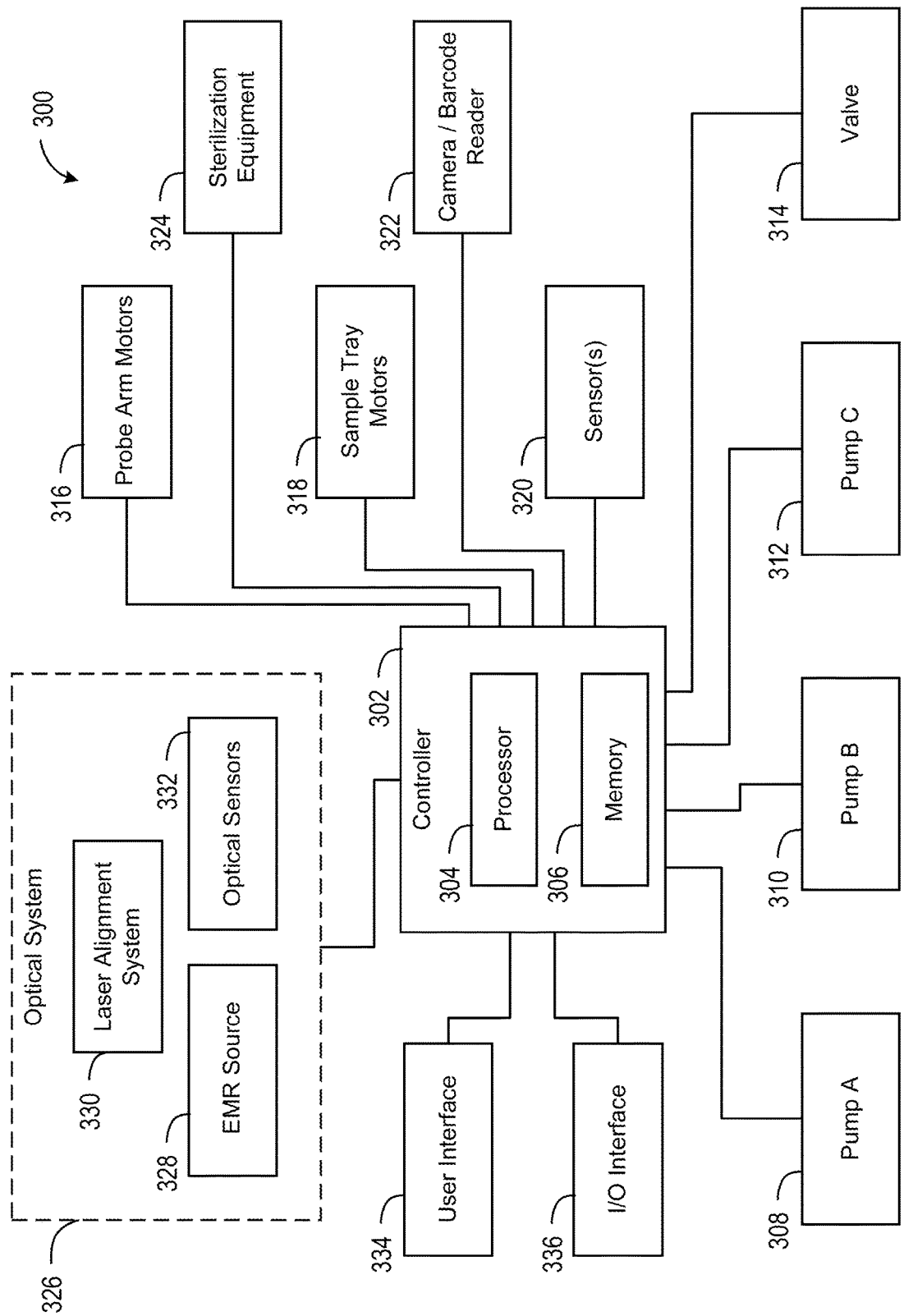
FIG. 3 is a block diagram of a control system for a flow cytometer, according to some embodiments.

Referring now to FIG. 3, a block diagram of a control system 300 for a flow cytometer (e.g., system 100) is shown, according to some embodiments. More specifically, system 300 is a control system for a flow cytometer that utilizes a plurality of electronically-controllable pumps to drive sheath fluid through the system, and to collect and deposit samples. As described briefly above, a flow cytometer that includes system 300 may, advantageously, cost significantly less than many other flow instruments and may be much more compact. Accordingly, such a flow cytometer may be more user-friendly and may be accessible to wider variety of users. Utilizing electronically-controllable pumps rather than an air-pressurized vessel of fluid as the source of the sheath flow may also provide a number of advantages over other flow instruments. Such advantages are described in greater detail below.

Control system 300 is shown to include a controller 302. Controller 302 may be communicably coupled to a variety of devices and/or subsystems of system 300. In this manner, controller 302 may exchange data and/or signals with any of these components in order to control operations of system 300. It will be appreciated that controller 302 may be coupled to more or fewer components than those shown in FIG. 3, in various other embodiments, and that the specific arrangement of components of system 300 is not intended to be limiting.

Controller 302 is further shown to include a processor 304 and memory 306. Processor 304 can be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. In some embodiments, processor 304 is configured to execute computer code stored in memory 306 to facilitate the activities described herein.

Memory 306 may be any volatile or non-volatile computer-readable storage medium capable of storing data or computer code relating to the activities described herein. According to an exemplary embodiment, memory 306 includes computer code modules (e.g., executable code, object code, source code, script code, machine code, etc.) configured for execution by processor 304. In some embodiments, controller 302 may represent a collection of processing devices (e.g., servers, data centers, etc.). In such cases, processor 304 represents the collective processors of the devices, and memory 306 represents the collective storage devices of the devices. While control system 300 is illustrated as including a single processor and memory, it should be understood that, in various implementations, the systems disclosed herein could have any number of processors and computer-readable storage media working in concert to implement the features described herein, and all such implementations are contemplated within the scope of the present disclosure.

System 300 is also shown to include a plurality of pumps 308-312. As described herein, pumps 308-312 may be electronically-controlled syringe pumps that are typically configured to withdraw or push out a fluid via syringe. However, in other embodiments, pumps 308-312 may be any suitable electronically-controlled, positive-displacement pumps, including but not limited to: rotary, reciprocating, linear, gear pump, screw pump, rotary valve, rotary lobe, rotary gear, plunger, piston, diaphragm, rope, chain, hydraulic, and/or progressive cavity pumps.

Each of pumps 308-312 generally includes one or more stepper motors that are configured to drive fluid into or out of the syringe. The stepper motors, in this case, may be direct-current (DC) driven electric motors that rotate in discrete steps. In this regard, the stepper motors can be controlled to rotate a specific number of steps and/or to hold a position at a specific step, providing precise control over the fluid flow fluid into or out of the syringe. Due to theses discrete steps, stepper motors typically operate or rotate in a series of small "pulses," herein referred to as characteristic pulses. Accordingly, a sheath fluid or sample driven by pumps 308-312 may be delivered (e.g., to a flow cell) in these characteristic pulses corresponding to the steps of the stepper motor. The result is a constant acceleration and deceleration of the sheath fluid, and thereby the particles of the sample, as they pass through the examination zone.

Controller 302 may control pumps 308-312 by sending signals to the one or more stepper motors of each pump, thereby actuate the corresponding pumps 308-312. In some embodiments, each of pumps 308-312 may also include an internal value that controls the direction of fluid transfer through the pump. In such embodiments, controller 302 may also be configured to actuate (i.e., switch) the valve to change the direction of fluid transfer. Controller 302 may also control a valve 314, which is separate from pumps 308-312, to control the direction of fluid flow through the system. A fluidics system for the flow cytometer disclosed herein is described in greater detail below, with respect to FIGS. 5A-5C.

Syringe pumps can provide a number of advantages over other systems that provide a sheath fluid using an air-over-fluid system. For example, syringe pumps are typically much more compact and can be less expensive than the components of an air-over-fluid system that utilizes a pressurized vessel of sheath fluid. Syringe pumps are also not affected by the level of sheath fluid source. For example, a syringe pump may provide constant pressure whether the sheath fluid source is full or near empty. In some cases, such as where a laboratory water supply is available, sheath fluid could even be mixed in real time using syringe pumps. Additionally, the syringe pumps of system 300 (e.g., pumps 308-312) are electronically-controllable via stepper motors, and accordingly the speed, and thereby pressure, of these syringe pumps can be varied instantaneously.

One advantage of instantaneous and/or variable speed and pressure is that syringe pumps can help to eliminate or dislodge clogs in a fluidics system for a flow instrument, by providing large amounts of pressure to power clogs though the tubing or flow cell of the instrument, often with no action required by a user. Another advantage is that the speed of sheath fluid, and thereby a sample carried by the sheath fluid through an examination, can be controlled. In such a manner, the velocity of the sample particles can be lowered when higher-sensitivity is required (e.g., for cytokine testing), and the velocity can be raised when high sensitivity is not required (e.g., for HLA testing).

Still referring to FIG. 3, system 300 is shown to include a variety of additional components that facilitate operations of the flow cytometer, including probe arm motors 316 and sample tray motors 318. In some embodiments, probe arm motors 316 and sample tray motors 318 may be stepper motors, as described above. Probe arm motors 316, for example, may include one or more motors or actuators configured to move a sample probe (e.g., carried by a probe arm) into a position for retrieving a sample (e.g., from an Eppendorf tube). In some embodiments, probe arm motors 316 may be included in a drive train or gear set for the probe arm that includes multiple gears, tracks, etc., to facilitate movement of the probe arm, and thereby a sample probe, in one or more planes (e.g., horizontally and vertically).

In conjunction with the probe arm, a sample plate may be maneuvered using sample tray motors 318 and, in some cases, a corresponding sample tray gear set. The sample tray may be configured to hold an assay microplate or other similar device for holding one or more sample (e.g., in one or more Eppendorf tubes). In some embodiments, the sample tray may hold a 96- or 384-well microplate, or at least one individual sample contained in a test tube (e.g., an Eppendorf tube). Sample tray motors 318, in combination with a sample tray gear set or gear system, may be configured to maneuver the sample tray in at least one plane. For example, the sample tray may be extended from the body of the flow cytometer to receive samples, and may be retracted into the body of the flow cytometer for analysis of the samples. Controller 302 may send signals to control (e.g., actuate) one or both of probe arm motors 316 and sample tray motors 318 in order to position a sample for collection by the sample probe.

Also in communication with controller 302 are a plurality of sensors 320, which may include any sensors in addition to those described below with respect to an optical system 326. Sensors 320 may include, for example, proximity sensors, pressure sensors, ultrasonic sensors, photodetectors, accelerometers, infrared sensors, etc. In some embodiments, sensors 320 include an infrared proximity sensor coupled to the probe arm and/or to a sample probe, and configured to detect a sample (e.g., in a test tube) as the sample probe is moved into position to collect the sample. The infrared proximity sensor may be attached near the sample probe and may be positioned to detect samples placed in the sample tray. Accordingly, based on data received from the infrared proximity sensor, the positioning of the sample probe can be adjusted as the sample probe is maneuvered (e.g., lowered) towards the sample (e.g., by actuating probe arm motors 316 and/or sample tray motors 318).

In some embodiments, sensors 320 also include pressure sensors configured to measure the fluid pressure of the sheath fluid and/or the sample as they pass through the system. In this regard, sensors 320 may include any number of suitable pressure sensors positioned throughout the flow cytometer, and more specifically throughout a fluidic system of flow cytometer, as described in greater detail below with respect to FIGS. 5A-5C. Data from the pressure sensors, and any of sensors 320, may be received by controller 302 for analysis, and may be utilized to determine control decisions. For example, based on pressure sensor readings, controller 302 may control the stepper motors of pumps 308-312 to adjust the speed and/or pressure of fluid flow through the system. In some embodiments, pressure sensor data may be used to detect a clog in the fluidics system, and the pressure within the system can be increase (e.g., controller 302 can increase the speed of one or more of pumps 308-312) to clear the clog. Additionally, controller 302 can ignore data captured in the event of a clog, until the pressure readings indicate that the clog is cleared.

In combination with sensors 320, system 300 may include one or more cameras and/or barcode readers 322. Cameras/bar code readers 322, for example, may include at least one internal camera within flow cytometer (i.e., within a housing of the flow instrument). The internal camera may configured to monitor flow cytometer operations to verify proper machine function when the flow cytometer is running (e.g., analyzing or testing samples). Accordingly, the internal camera can double as a remote diagnostic tool, where a user of the flow cytometer can view a live feed or images from the camera while the flow cytometer is operating.

Cameras/barcode readers 322 may also include a bar code reader configured to scan a bar code attached to a particular sample (e.g., attached to a particular Eppendorf tube) or attached to a microplate that holds multiple samples. Based on the scanned bar code, controller 302 may be configured to verify the sample tray (e.g., by comparing the sample tray's bar code against a database), or may verify that a particular Eppendorf tube is carried by an appropriate sample tray. Accordingly, the bar code reader may provide validation of inserted samples to aid in record keeping and accurate measurements.

System 300 is also shown to include sterilization equipment 324. Sterilization equipment 324 may include any number of devices that can be configured to clean, sterilize, and/or sanitize the interior systems of the flow cytometer described herein. In some embodiments, sterilization equipment 324 includes an ultraviolet lamp or LED that operates in the UV-C range of wavelengths. The UV-C lamp may be activated to bathe at least a portion of the interior of the flow cytometer in UV-C light (i.e., electromagnetic radiation), in order to inactivate susceptible micro-organisms. Additionally, sterilization equipment 324 may include an ozone generator that can produce ozone for sanitizing the components of the flow cytometer. Sterilization equipment 324 is not, however, limited to a UV-C lamp and/or an ozone generator, and may include any other suitable sterilization equipment in other embodiments.

Still referring to FIG. 3, system 300 further shown to include an optical system 326. Optical system 326 may include any of the optical testing equipment described above with respect to FIG. 1, for example, which may be configured to irradiate a particle (e.g., passing through an examination zone) and capture data from the light scatter or emissions of the particle. Data captured from passing particles may be transmitted to controller 302 for analysis.

Optical system 326 is shown to include an electromagnetic radiation (EMR) source 328 and a laser alignment system 330. EMR source 328 may include any device that is capable of directing electromagnetic radiation at an examination zone, thereby irradiating a passing particle. Typically, EMR source 328 may include one or more lasers or other suitable lamps (e.g., xenon) capable of producing electromagnetic radiation in a particle range of wavelengths. In one example, as described in greater detail below with respect to FIG. 8, EMR source 328 includes at least three high-power lasers, each configured to produce a particular range of wavelengths.

EMR source 328 may be automatically aligned using laser alignment system 330. Laser alignment system 330 is an electromechanical assembly including at least one motor and a cam system that is configured to align EMR source 328, in order to direct the radiation or light produced by EMR source 328 towards an examination zone. In some embodiments, laser alignment system 330 can align components of EMR source 328 and/or one or more additional optical components (e.g., reflectors, lenses, etc.) to within 1 μrad of a desired position.

One or more optical sensors 332 of optical system 326 can measure (i.e., capture) the light scatter and/or fluorescent emissions from a passing irradiated particle. For example, as described with respect to FIG. 1, as a passing particle is irradiated, at least a portion of the incident light (e.g., from EMR source 328) may be scattered by the particle. Optical sensors 332 may include at least a forward-scatter detector and a side-scatter detector, positioned in front of and to the side of an examination zone, respectively, which detect the light scatter. Additionally, optical sensors 332 typically include one or more detectors for capturing fluorescent emissions from the particle.

In some cases, where EMR source 328 includes multiple lasers that produce varying wavelength ranges, the one or more fluorescent emissions detectors include detectors configured to detect each of the particular wavelength ranges. In some embodiments, optical sensors 332 are any suitable solid-state optical sensors, such as complementary metal-oxide-semiconductor (CMOS) sensors. In other embodiments, optical sensors 332 include photomultiplier tubes (PMT), avalanche photodiodes (APD), or other suitable optical sensors. In such embodiments, one or more PMT, APD, or other optical sensors may be utilized in combination with one or more solid-state (e.g., CMOS) sensors.

In addition to EMR source 328, laser alignment system 330, and optical sensors 332, optical system 326 can include one or more reflectors, lenses, filters, or other optics for directing, filter, reflecting, or otherwise manipulating light or emissions produced by EMR source 328 or emitted/scattered by a particle. In one example, optical system 326 includes a plurality of reflectors (e.g., dichroic reflectors) corresponding to each of the one or more components (e.g., lasers) of EMR source 328. In another example, optical system 326 includes a plurality of reflectors and filters corresponding to one or more of the optical sensors 332, configured to direct side-scattered light and emission towards the sensors, and/or to filter out unwanted wavelengths of radiation or light (e.g., for more accurate measurements). In yet another example, optical system 326 include one or more lenses or lens systems for focusing or adjusting the light produced by EMR source 328 (e.g., to irradiate a particle) and/or the light or emissions detected by optical sensors 332.

In some embodiments, optical system 326 includes at least one narrow band optical filter (e.g., optical filters 106) configured to allow a very narrow range of wavelengths (e.g., 1 to 2 nanometers (nm)) of EMR or light to pass through the filter. In some such embodiments, the narrow band filter may be configured to pass wavelengths between 618 and 620 nm, thereby expanding the dynamic range of the optical sensors 332. Additional description of the particular components of optical system 326 are described in greater detail below, with respect to FIGS. 8 and 9.

Figure 6:
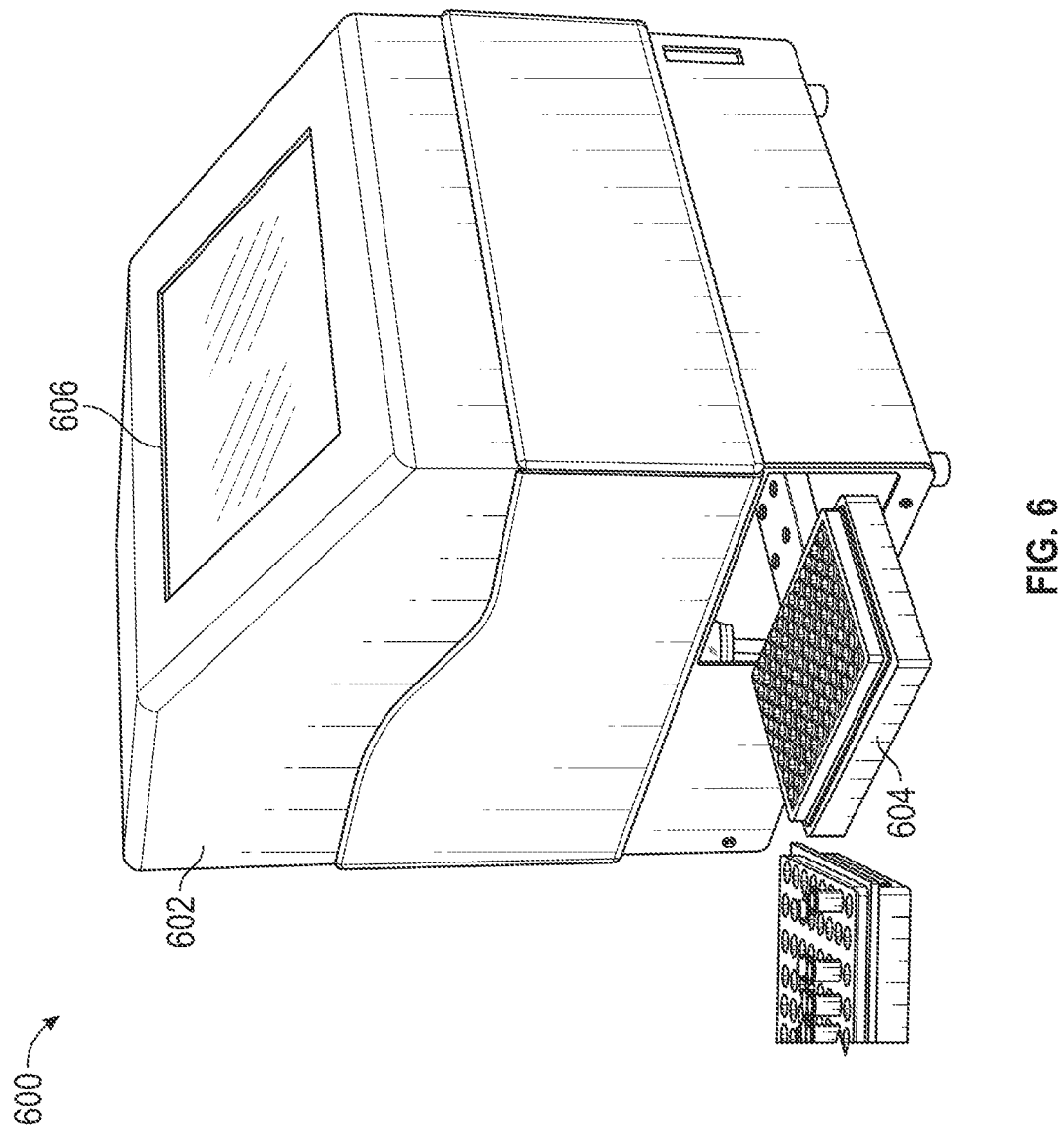
FIG. 6 is an external, perspective view of a flow cytometer that utilizes syringe pumps to drive sheath fluid, according to some embodiments.

Still referring to FIG. 3, system 300 is further shown to include a user interface 334. User interface 334 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with system 300, its subsystems, and/or devices. User interface 334 may be a stand-alone computer workstation, a client terminal, a remote or local interface, or any other type of user interface device. For example, client device 368 may be a desktop computer, a computer server with a user interface, a laptop computer, a tablet, a smartphone, a PDA, or any other type of mobile or non-mobile device. In another example, as shown in FIG. 6, user interface 334 may include a screen that may be contained within a housing of the flow cytometer described herein. The screen may be any suitable LED, LCD, OLED, ELD, etc., screen capable of exchanging information with controller 302. In some cases, user interface 334 includes a keyboard, a mouse, a touchscreen, or any other device for receiving user inputs.

System 300 also includes an input/output (I/O) interface 336. I/O interface 336 may include any components or ports that allow controller 302 to exchange data with external devices or systems. For example, I/O interface 336 can include secured or unsecured WiFi and/or Ethernet ports for connecting controller 302 to a network (e.g., an intranet, a server, the Internet, etc.). Such a network connection would allow controller 302 to exchange data regarding the testing and analysis of samples with an external device (e.g., with a server or another computer). Additionally, I/O interface 336 may include inputs and outputs for exchanging data between controller 302 and one or more additional laboratory instruments, or a lab information system, via an application program interface (API) configured to read, write, or otherwise communicate using JavaScript notation (JSON).

Figure 4:
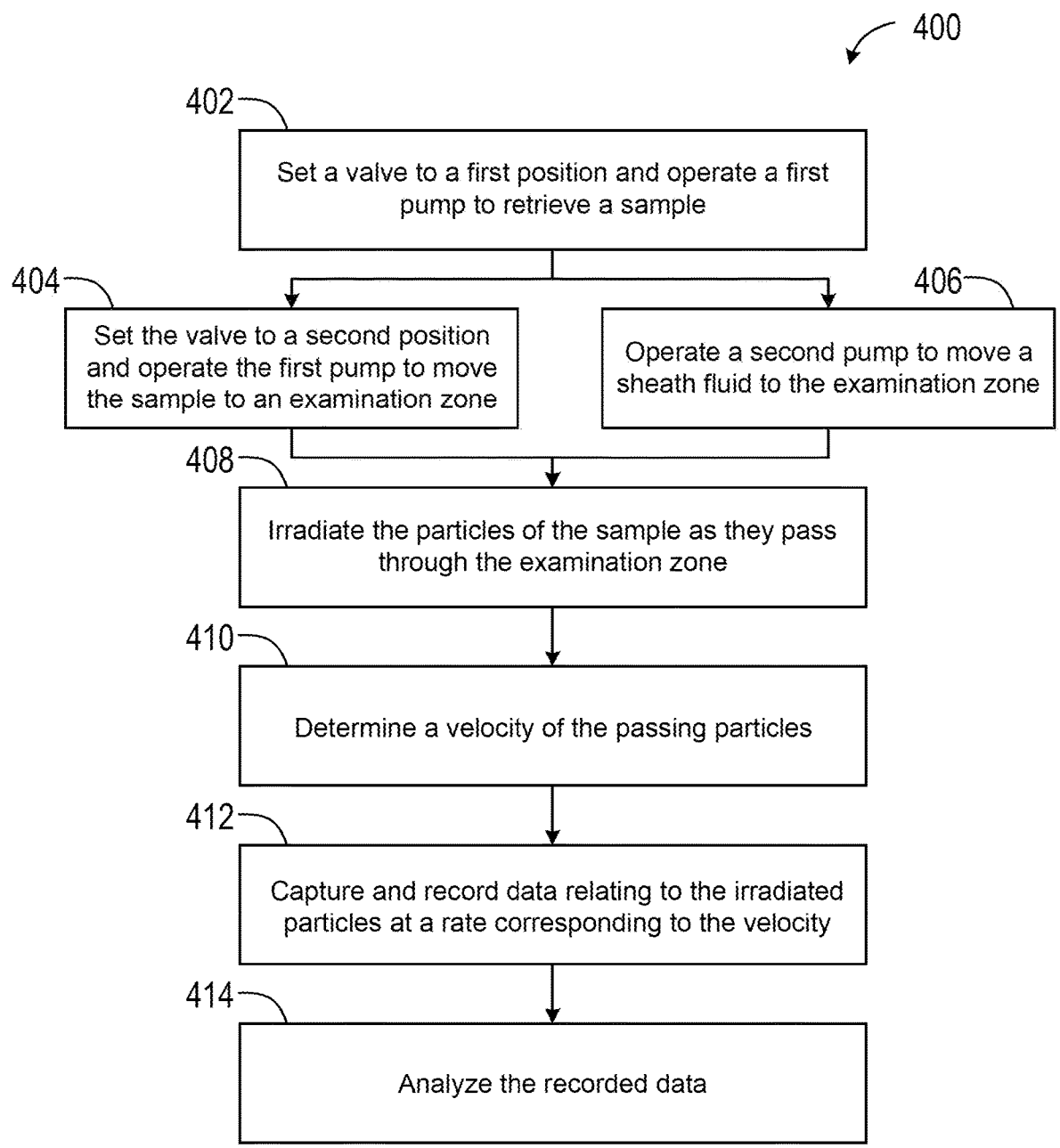
FIG. 4 is a flowchart of a process for controlling a plurality of pumps to drive sheath fluid through a flow cytometer, according to some embodiments.

Referring now to FIG. 4, a flowchart of a process 400 for controlling a plurality of electronically-controllable, positive displacement pumps (e.g., pumps 308-312) to drive sheath fluid through a flow cytometer is shown, according to some embodiments. Process 400 may be implemented by controller 302, for example, is generally implemented for a flow cytometer, such as the flow cytometer described herein, which utilizes a plurality of syringe pumps driven by stepper motors. It will be appreciated that certain steps of process 400 may be optional and, in some embodiments, process 400 may be implemented using less than all of the steps.

At step 402, a valve is set to a first position and a first pump (e.g., a syringe pump such as one of pumps 308-312) is operated to retrieve a sample. The valve, in this case, may be an electronically-controllable valve such as valve 314 described above. The valve may be set to a first position or direction to allow the first pump to retrieve (e.g., by generating suction) a sample from a sample tray. In other words, the first position of the valve may operably connect the first pump to a sample probe for collection of the sample. As described above, the sample may be retrieved via a sample probe place into an Eppendorf tube or other similar vessel that contains the sample. A controller (e.g., controller 302)

may control a stepper motor of the first pump (e.g., a syringe pump such as pump 312) to facilitate sample retrieval.

At step 404, the valve (e.g., valve 314) is set to a second position and the first pump is operated to transport (i.e., move) the sample to an examination zone, or to multiple examination zones. The second position of the valve may place the first pump in connection with one or more flow cells that constitutes one or more examination zones, for example. Accordingly, the controller may reverse the rotation of the first pump (e.g., from the direction of rotation in step 402) in order to push the sample through the valve and to the flow cell.

At step 406, either concurrently with, or before or after step 404, a second pump (e.g., a syringe pump such pump 310) may be operated to move a sheath fluid to the examination zone. In other words, the controller may operate the second pump to force the sheath fluid through the flow cell. As described above with reference to FIG. 1, the sheath fluid may be forced through the flow cell at a considerable velocity to generate laminar flow. The sample may be forced through the flow cell (e.g., by the first pump) at a slightly slower velocity than the sheath fluid, and accordingly may be hydrodynamically focused in a "core" of the sheath fluid as it passes through the flow cell. As described above, this may align the particles of the sample for analysis. Various aspects of steps 402-406 of process 400 may be made more clearly understood with the discussion of FIGS. 5A-5C, below.

At step 408, individual particles of the sample are irradiated as they pass through the examination zone (e.g., through the flow cell). In some cases, as described above for example, the particles of the sample may be fluorescently dyed prior to testing. As a particle passes through the flow cell, an EMR source (e.g., EMR source 328), such as one or more lasers, may be focused on the passing particle. In some embodiments, as briefly described above, the particles may pass through multiple examination compartments and, accordingly, may be irradiated with a particle wavelength or range of EMR at each compartment. A more detailed discussion on the irradiation of passing particles is presented above, with respect to FIGS. 1 and 2.

At step 410, a velocity of the passing particles is determined, generally based on the velocity of the sheath fluid used to transport the particles. As discussed above, for example, syringe pumps (e.g., pumps 308-312), or any other similar type of pump that is driven using a stepper motor, generally moves fluid in a series of characteristic pulses corresponding to the steps of the stepper motor. Theses characteristic pulses may result in a constant acceleration and deceleration of sheath fluid and/or a sample as it is forced through the examination zone. In other words, the velocity of passing particles may be constantly varying with the characteristic pulses from the syringe pumps. The velocity of the passing particles due to the variable sheath fluid velocity resembles a sinusoidal wave, where a peak amplitude of the wave corresponds to a highest velocity and a trough of the wave corresponds to a lowest velocity. Similarly, the period of the wave may represent an amount of time between characteristic pulses (e.g., between steps of the syringe pump).

In some embodiments, the variation in velocity of a particle and/or the sheath fluid may be determined by measuring an amplitude of the characteristic pulses using one or more pressure sensors (e.g., of sensors 320). In such embodiments, the pressure measurement may correspond to the previously described sinusoidal wave, where positive components of the wave correspond to an increase in pressure (e.g., with the fluidics system and/or within the examination zone) while negative components of the wave correspond to a decrease in pressure. Accordingly, a peak in the wave may indicate a moment of greatest (i.e., strongest) pressure while a trough indicates a moment of weakest pressure. In this regard, the velocity of the particle may be proportional to the detected pressure, where a peak in the pressure measurement corresponds to a highest velocity while a trough may indicate a lowest velocity.

In some embodiments, the variation in velocity of a particle and/or the sheath fluid may be determined by measuring a time of flight of constant size passing particles. In such embodiments, the time of flight may be determined via one or more optical sensors (e.g., optical sensors 332). For example, the time of flight may be determined based on the variation between EMR measurements from passing particles, or by using other optical sensors to detect passing particles and to determine a time difference between passing particles. In some embodiments, the variation in velocity of a particle can be determined by a combination of pressure readings and time of flight calculations. It will be appreciated, however, than other suitable methods for determining the variation in velocity of a passing particle may be utilized.

In some embodiments, the variation in velocity of passing particles is determined during a calibration period, prior to the testing of samples. During the calibration period, a user may set assay requirements for the samplings to be tested. The assay requirements may indicate, for example, whether high-sensitivity is required for the measurements. From the assay requirements, a period of a sinusoidal wave corresponding to the characteristic pulses of the syringe pumps (e.g., mainly the syringe pump that provides a sheath fluid) can be determined. For example, to achieve high-sensitivity measurements, the velocity of the sheath fluid, and thereby the sample particles, can be decreased. Accordingly, the period of the sinusoidal wave can be increased.

As described above, the amplitude of the sinusoidal wave, which may correspond to a velocity of a particle, can be estimated from pressure or time of flight measurements during the calibration process. Based on the calibrated sinusoidal wave (e.g., based on the estimated amplitude and period of the sinusoidal wave), a high-speed counter or clock (e.g., internal or external to controller 302) can be calibrated. In some cases, the phase of the estimated sinusoidal wave can be "locked" based on an interval between a "pump on" message (e.g., a command from controller 302 to one of pumps 308-312 that moves sheath fluid) and the measurement of a first and/or strongest peak amplitude during the calibration period.

At step 412, EMR emitted or scattered by a particle is captured by one or more sensors (e.g., optical sensors 332) at a rate corresponding to the velocity of the particle. As described with respect to FIG. 1, for example, at least forward-scattered light (i.e., EMR), side-scattered light, and fluorescence of a passing fluorescently dyed particle (FDP) may be detected and/or recorded. Due to the characteristic pulses of syringe pumps, as discussed above, said data is captured at a rate that is phase-locked with the characteristic pulses in order to provide accurate measurements at the moment when a particle passes through the examination zone. In this regard, the capture rate (i.e., sampling rate) of the data may be varied based on the sinusoidal wave described at step 410, and thereby in direct proportion with the velocity of a passing particle.

As described, the sinusoidal wave that is estimated at step 410 may indicate variances in sheath fluid velocity, which in turn can indicate variances in the velocity of a particle being carried by the sheath fluid through an examination zone. Accordingly, the capture rate of data (e.g., EMR emitted or scattered by the passing particle) may be varied according to the sinusoidal wave. For example, as the slope of the sinusoidal wave increases (i.e., a positive slope), the capture rate of the data may also be increased (e.g., by controller 302). Likewise, when the slope of the sinusoidal wave decreases, the capture rate of the data is decreased. Accordingly, the maximum and minimum rates of capture may be proportional to the peaks and troughs of the estimated sinusoidal wave, and thereby may be proportional to the measured amplitude of the sheath fluid pulses.

At step 414, the captured data is analyzed to determine one or more characteristics of the particles. Detected forward-scattered light may be proportional to the surface area or size of a particle, for example, while detected side-scattered light may indicate a particle's granularity or the internal complexity of a cell. Additionally, fluorescent emissions from the particle may indicate one or more additional features of the particle. In some embodiments, a fluorescent emission intensity is determined. Fluorescent emission intensity is defined by a capture of a number of photons having wavelengths falling within a predetermined band.

In addition, at step 414, other data may be compiled relating to the analysis of the irradiated sample particles. For example, the a row and column corresponding to a location of the sample being analyzed may be determined (e.g., using a proximity sensor and/or camera associated with the sample probe) and recorded (e.g., by controller 302) to determine a particle well of a multi-well assay microplate (e.g., a 96- or 384-well plate) that the sample was retrieved from. The information compiled and/or analyzed at step 414 may also include a region in fluorescent space in which the captured electromagnetic radiation emitted or scattered by the passing particle falls. In some embodiments, a median fluorescent intensity of the captured EMR emitted or scattered by the passing particle is determined. In some embodiments, a trimmed mean fluorescent intensity of the captured electromagnetic radiation emitted or scattered by the passing particle is also determined. It these or other embodiments, any other information may be determined or compiled (e.g., by controller 302) based on the recorded data from the sample particles.

Figure 5A:
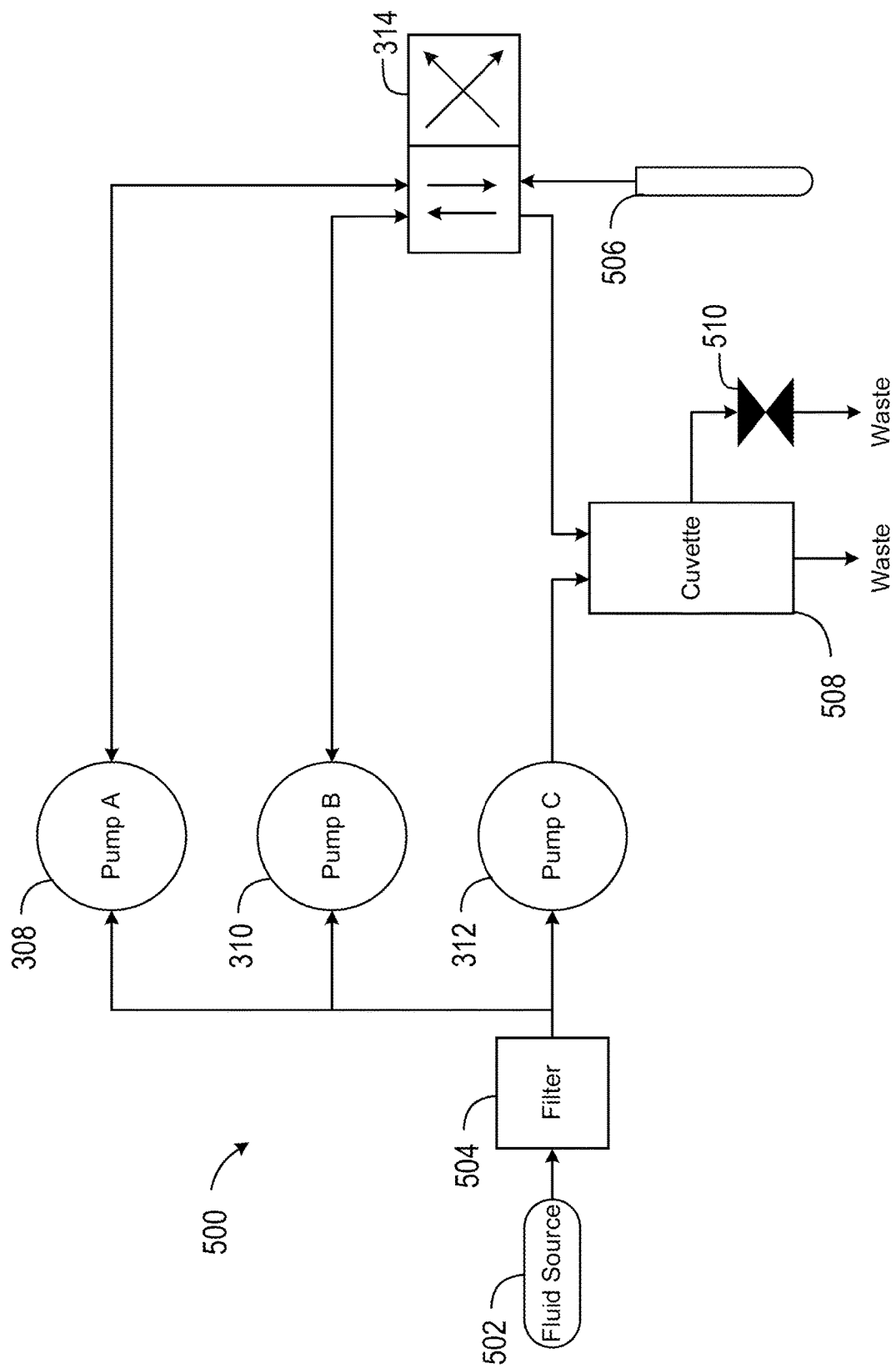
FIGS. 5A-5C are diagrams illustrating a fluidics system for a flow cytometer, according to some embodiments.
Figure 5B:
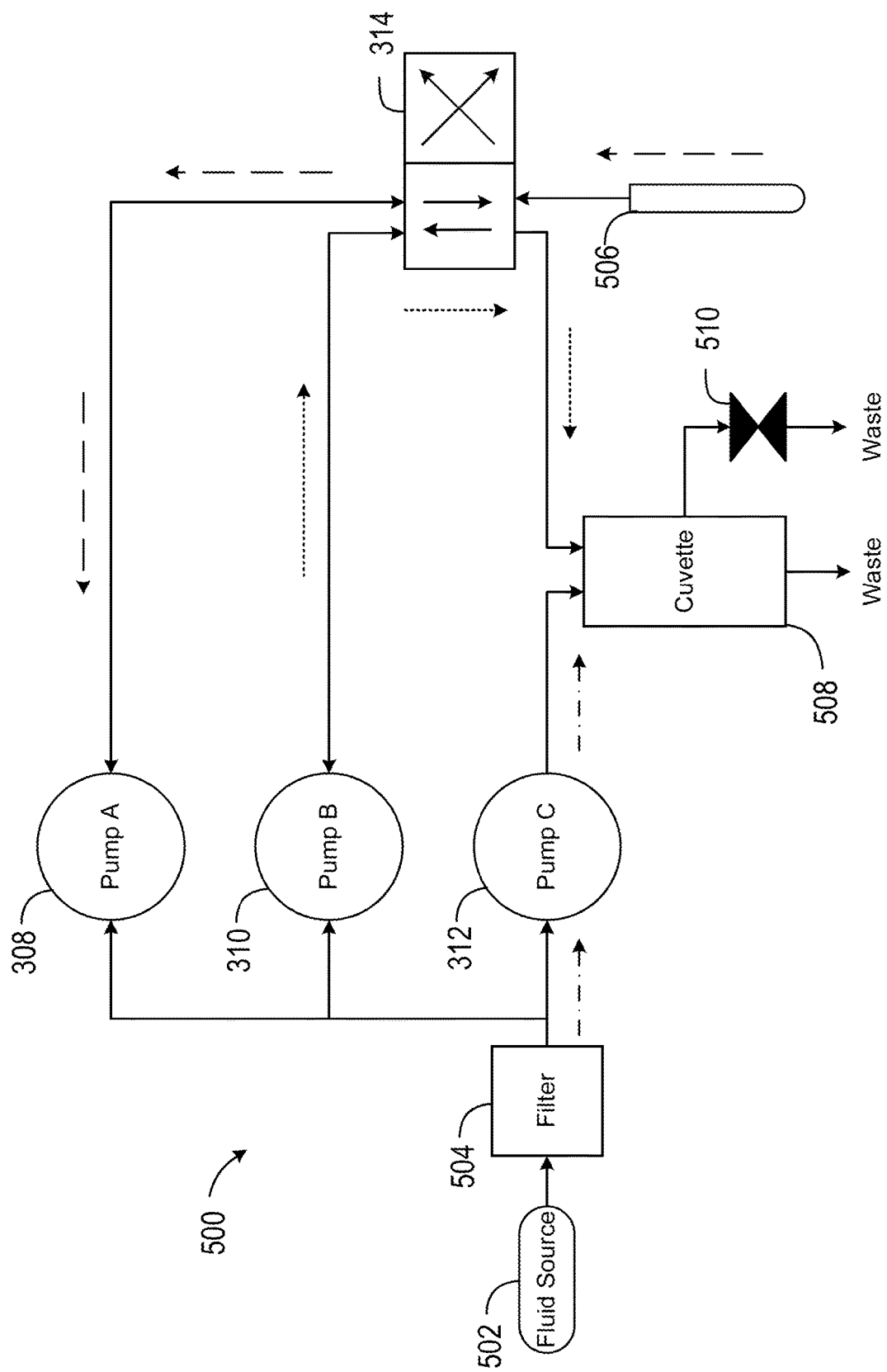
Figure 5C:
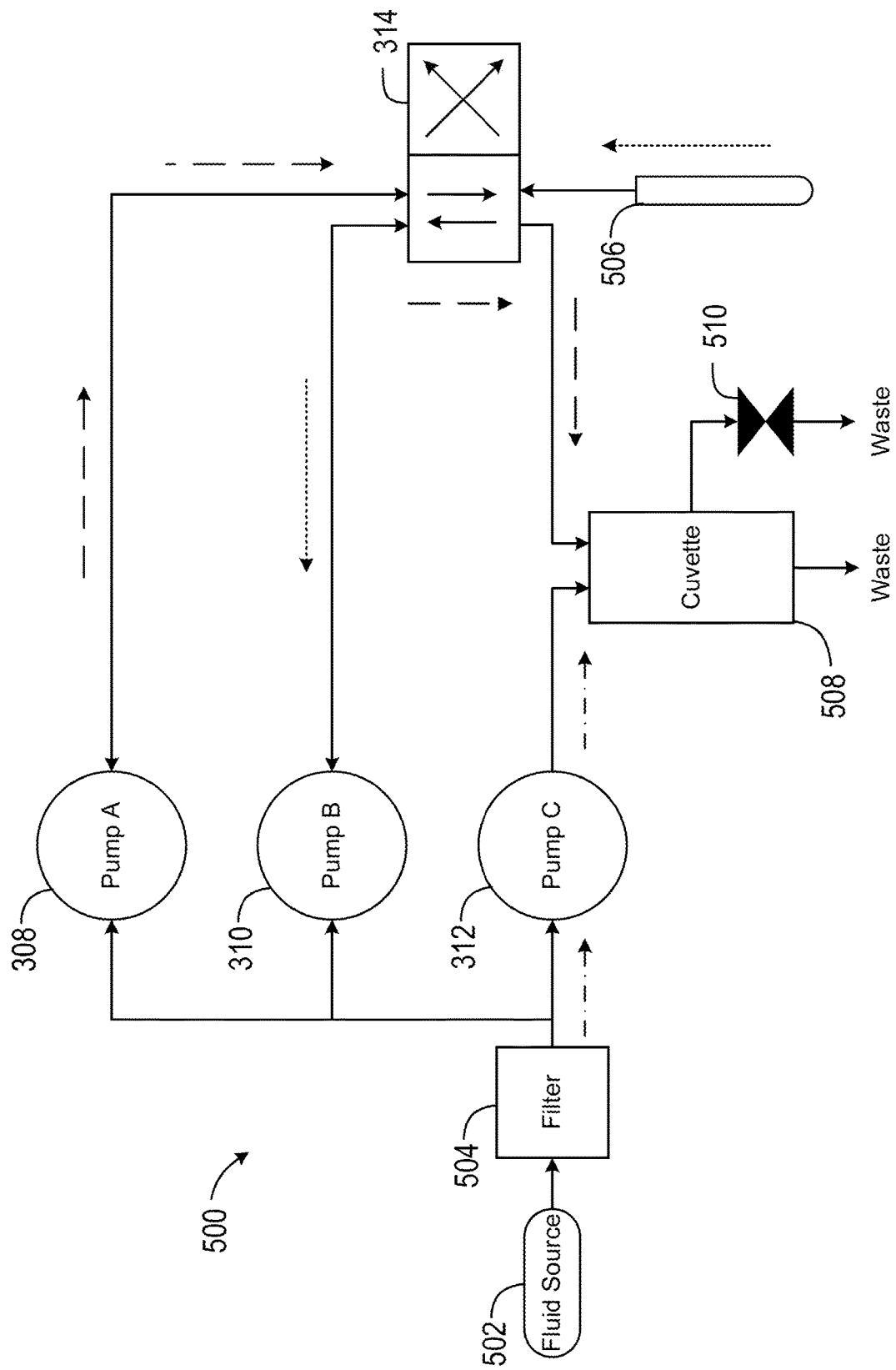

Referring now to FIGS. 5A-5C, diagrams illustrating a fluidics system 500 for a flow cytometer utilizing syringe pumps are shown, according to some embodiments. System 500 may be an example of a fluidics system utilized in by the flow cytometer described herein, for example. FIGS. 5A-5C may help to illustrate the flow of both sheath fluid and samples through the systems described above. FIG. 5A, in particular, provides an overview of system 500 while FIGS. 5B and 5C illustrate various operating modes of system 500.

Turning first to FIG. 5A, system 500 is shown to include a fluid source 502, which may be any source of a sheath fluid such as saline solution, water, etc. In some embodiments, fluid source 502 may be a container or vessel of sheath fluid. In other embodiments, fluid source 502 includes a laboratory water supply. In such embodiments, the flow cytometer described herein may include an external connection (e.g., a fluid port) to receive fluid from an external source (e.g., a laboratory water supply and/or a container of concentrate or sheath fluid mix) in order to supply sheath fluid (e.g., deionized or distilled water) directed into system 500. In this case, sheath fluid may mixed as it enters system 500. The sheath fluid may optionally pass through a filter 504 to remove larger particulates, minerals, etc.

In some embodiments, fluid source 502 or a second fluid source (not shown) may include a source of a cleaning solution for cleaning and/or sanitizing system 500. In such embodiments, system 500 may also include a fluid port for receiving the cleaning solution. The cleaning solution may comprise approximately 10% aqueous bleach mixed with water, for example. Each of pumps 308-312, as described herein, may also include a valve that allows the pump to pass said cleaning solution through the pump and out of the system. In this manner, system 500 may support automatic cleaning cycles.

In some embodiments, one or more bubble detectors (e.g., of sensors 320) may monitor fluid source 502 for bubbles and/or a fluid level. These bubble detectors may trigger a warning or alarm when the sheath fluid and/or the cleaning solution is empty or nearly empty. In cases where one or both of the sheath fluid or cleaning solution is received from a connection to an external system (e.g., a laboratory water supply), the bubble detectors may also indicate a problem with the external system. In the event of a "fluid out" alarm or warning condition, controller 302 may maintain previously recorded or captured sample data from a sample.

The sheath fluid may be retrieved (i.e., "pulled") from fluid source 502 by pump 312 ("Pump C"). Pump 312, as described above, is generally an electronically-controlled, positive displacement pump, and is more specifically a syringe pump driven by a stepper motor. Pump 312 may be configured to move sheath fluid from fluid source 502, through filter 504, and to a cuvette 508. In this example, cuvette 508 is the "examination zone" and/or flow cell (e.g., flow cell 102) for the system. In certain other examples, system 500 may include multiple flow cells and, accordingly, multiple cuvettes 508. Cuvette 508 is typically a thin-wall cuvette that accommodates a high-numerical aperture objective lens to provide increased sensitivity over other flow cytometry systems. In some embodiments, cuvette 508 includes a narrow flow channel running through the central axis of the cuvette. Said flow channel may, in some cases, be slightly hour-glass shaped.

System 500 includes two additional pumps, pump 308 ("Pump A") and pump 310 ("Pump B"). Similar to pump 312, and as described above, pumps 308 and 310 are generally electronically-controlled, positive displacement pumps, specifically syringe pumps, driven by stepper motors. Pumps 308 and 310 may be configured to retrieve samples via a sample probe 506, which may be inserted into a sample (e.g., into an Eppendorf tube containing a sample).

Sample probe 506 can be constructed of any suitable materials, and is generally coupled to a sample probe arm, as described above, that facilitates movement of the probe to collect a sample. Sample probe 506 is generally comprised of a hollow tube having an outer diameter of about $\frac{1}{32}$ of an inch and protruding by about $\frac{1}{4}$ inches (e.g., ±25%) from an outer jacket having an outer diameter of about $\frac{1}{16}$ of an inch. These dimensions allow sample probe 506 to displace less sample fluid than many other probes for other flow cytometry system, because only the $\frac{1}{32}$ inch inner hollow tube makes contact with a liquid sample. For example, certain other probes may have an outside diameter of $\frac{1}{16}$ of an inch, but may not include an inner diameter tube with an outside diameter of $\frac{1}{32}$ of an inch. Accordingly, sample probe 506 exhibits a surface area that is between about 5% to about 10% that of certain other probes, providing less sample carryover as sample probe 506 is maneuvered between samples (e.g., between wells of an assay microplate).

Valve 314 can help to control the flow of sample fluid between sample probe 506, pumps 308 and 310, and cuvette 508. For example, valve 314 may be placed in a first position where pump 308 can retrieve a first sample from sample probe 506 and pump 310 can transfer a second sample to cuvette 508. When valve 314 is switched (e.g., by controller 302) to a second position, pump 308 can transfer the first sample to cuvette 508 while pump 310 retrieves a third sample from sample probe 506.

Once a sample and sheath fluid is passed through cuvette 508 (e.g., to be irradiated and measured), the sample and sheath fluid may exit system 500 to a waste container or port. In some cases, the sample and sheath fluid may be collected for additional processing (e.g., cell or particle counting). Additionally, in cuvette 508 may be completely flushed by opening a flow cell valve 510. In some embodiments, valve 510 may facility the automated cleaning cycles described above, where valve 510 is opened (e.g., by controller 302) prior to a cleaning cycle in order to flush cuvette 508 with cleaning solution.

Turning now to FIGS. 5B and 5C, the operations of system 500 are illustrated via the flow of sheath fluid and sample fluid through the system. FIG. 5B, for example, illustrates operations when valve 314 is placed in a first position. In this example, a sheath fluid is transported from fluid source 502 through pump 312 and to cuvette 508 while pump 310 pushes a previously collected sample through valve 314 and to cuvette 508 to be irradiated. At the same time, pump 308 collects (i.e., retrieves) a new sample via sample probe 506. The new sample is does not enter pump 308, but it held by pump 308 in a length of tubing between pump 308 and valve 314.

At FIG. 5C, valve 314 is switched to a second position, and the flow from each of pumps 308 and 310 is reversed. More specifically, pump 308 pushed the sample collected in FIG. 5B through valve 314 and to cuvette 508 for irradiation. Simultaneously, pump 310 collects a sample via sample probe 506. In this manner, system 500 allows for rapid testing of samples, as one of pumps 308 and 310 can retrieve a sample while the other pushes a sample through the examination zone.

Referring now to FIG. 6, an external, perspective view of a flow cytometer 600 that utilizes syringe pumps to drive sheath fluid is shown, according to some embodiments. In general, flow cytometer 600 may be one embodiment of a flow cytometer that includes the systems described above (e.g., system 100, system 300, and/or system 500). Accordingly, flow cytometer 600 may be a more compact and lower cost flow instrument when compared to many other flow cytometers in the market. It will be appreciated, however, that the particular layout, configuration, and design of flow cytometer 600, as described herein, is not intended to be limiting, and that the design and layout shown may be modified, altered, or replaced in various other embodiments.

As shown, flow cytometer 600 includes a housing 602 that, in various configurations, can enclose any of the systems described above (e.g., system 100, system 300, and/or system 500). Housing 602 may be constructed of any suitable material, such as various types of metal or plastic, and may include an internal frame constructed of similar materials. Housing 602 is shown to include an opening along one side to facilitate the extension or retraction of a sample table 604. In the example shown, sample table 604 is shown to carry a 96-well microplate that may be populated with Eppendorf tubes (e.g., or another suitable container) containing samples to be tested. Accordingly, once a microplate containing samples for testing is placed on sample table 604, sample table 604 can be retracted into the body of flow cytometer 600.

Flow cytometer 600 also include a user interface 606. In some embodiments, user interface 606 is substantially similar to user interface 334, described above right reference to FIG. 3. Accordingly, user interface 606 may be a touch-screen device, though with a user can interact with flow cytometer 600. In one example, a user may interact with user interface 606 in order to adjust settings or set parameters for the various systems of flow cytometer 600. In another example, the user may utilize user interface 606 to start or stop a testing cycle. In some embodiments, user interface 606 may be communicably coupled to a controller (e.g., controller 302) or other processing unit of flow cytometer 600.

Figure 7:
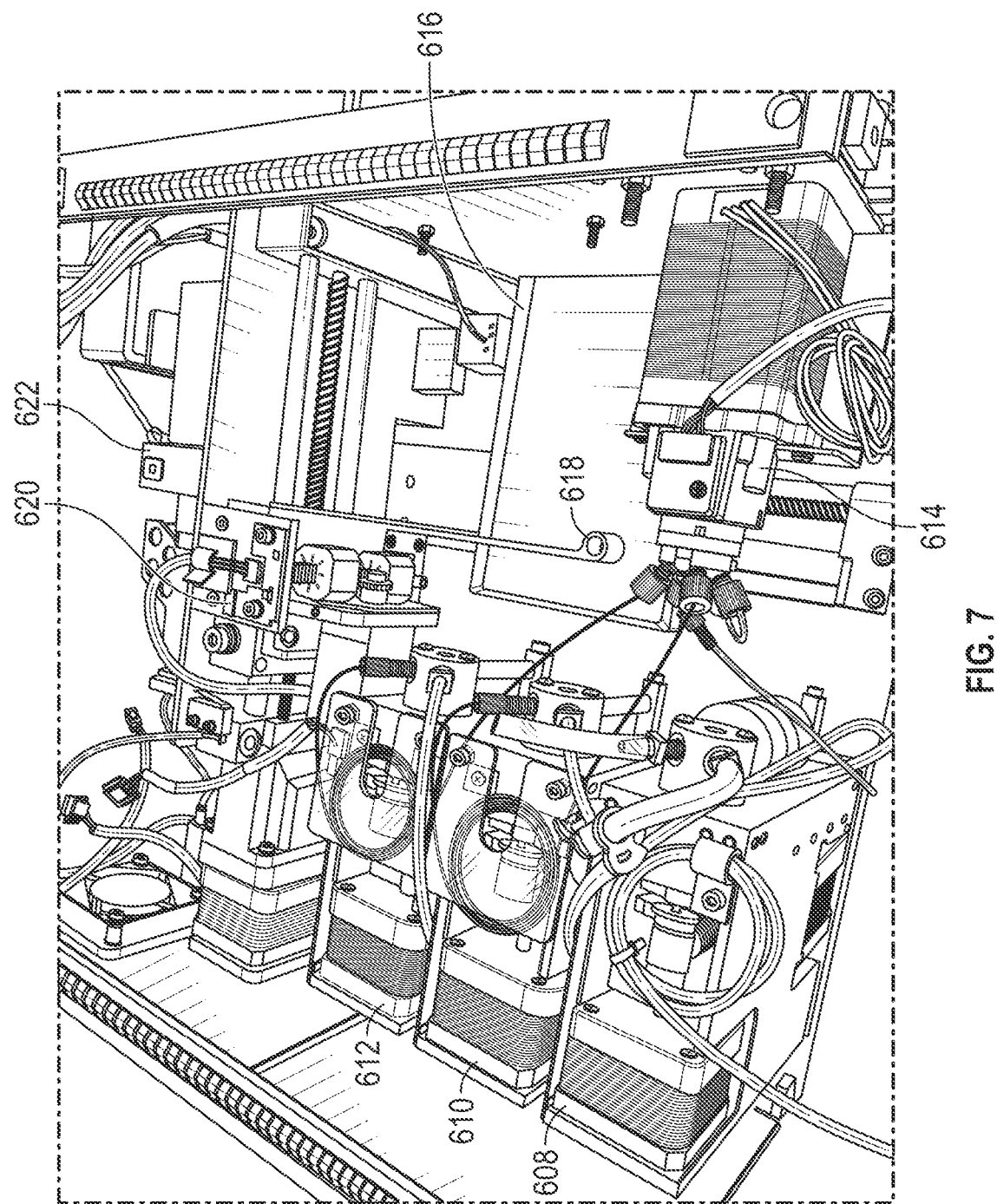
FIG. 7 is an internal, perspective view of fluid delivery system of the flow cytometer of FIG. 6, according to some embodiments.

Referring now to FIG. 7, a perspective view of a fluid delivery system (i.e., fluidics system) of flow cytometer 600 is shown, according to some embodiments. The fluid delivery system shown in FIG. 7 may be an example embodiment of fluidics system 500, described above, for example, and is generally contained within housing 602. It will be appreciated by those in the art that the particular layout, configuration, and type of components shown in FIG. 7 is not intended to be limiting, and that the components and layout may be modified, altered, or replaced in various other embodiments.

The fluidics system of flow cytometer 600 is shown to include a plurality of pumps 608-612. Generally, flow cytometer 600 includes at least three pumps, and pumps 608-612 are generally the same as, or functionally equivalent to, pumps 308-312 described above. In this regard, while generally described herein as syringe pumps, pumps 608-612 may be any other suitable type of pump that can be operated (i.e., controlled) by controller 302, such as by controlling a pump motor speed. Accordingly, in various other embodiments, pumps 608-612 may be any type of positive displacement pump, including but not limited to: rotary, reciprocating, linear, gear pump, screw pump, rotary valve, rotary lobe, rotary gear, plunger, piston, diaphragm, rope, chain, hydraulic, and progressive cavity pumps.

Flow cytometer 600 is also shown to include an electronically controllable valve 614, which may be the same as valve 314, described above with respect to FIG. 3. In this example, valve 614 is a 2-position, 6-port valve, although any other suitable electronically controllable valve could be used. Valve 614 is generally configured to direct the flow of a sample between a sample probe, one or more of pumps 608-612, and a cuvette (e.g., for examination). As shown, for example, valve 614 may direct the flow of a suspended particle solution (i.e., sample) though a tubing connected between valve 614 and pumps 608-612. Additionally, FIG. 7 shows a power supply 622 which may be any suitable power supply for powering pumps 608-612 and/or valve 614.

As described above, a sample tray 616 may be may be extended (e.g., by at least one motor or actuator) to an exterior of flow cytometer 600 in order to receive an assay microplate or other similar apparatus for holding a plurality of samples (e.g., contained in a plurality of Eppendorf tubes). Sample tray 616 may then be at least partially retracted into the interior of flow cytometer 600. Subsequently, a probe arm 618 carrying a probe may be actuated (e.g., in at least two directions) by an actuator assembly 620 in order to engage a particular sample. In other words, the probe may be placed into a particular sample (e.g., in a particular Eppendorf tube) containing a sample to be tested by moving probe arm 618 along one or more planes. To accomplish this movement, actuator assembly may include one or more gears, motors, actuators, and other suitable components to move probe arm 618 in at least two planes (e.g., a vertical and a horizontal axis) with respect to sample tray 616. Like pumps 608-612 and valve 614, one or more of the actuators or motors (e.g., of actuator assembly 620) used to move sample tray 616 and/or probe arm 618 may be powered by power supply 622.

Figure 8:
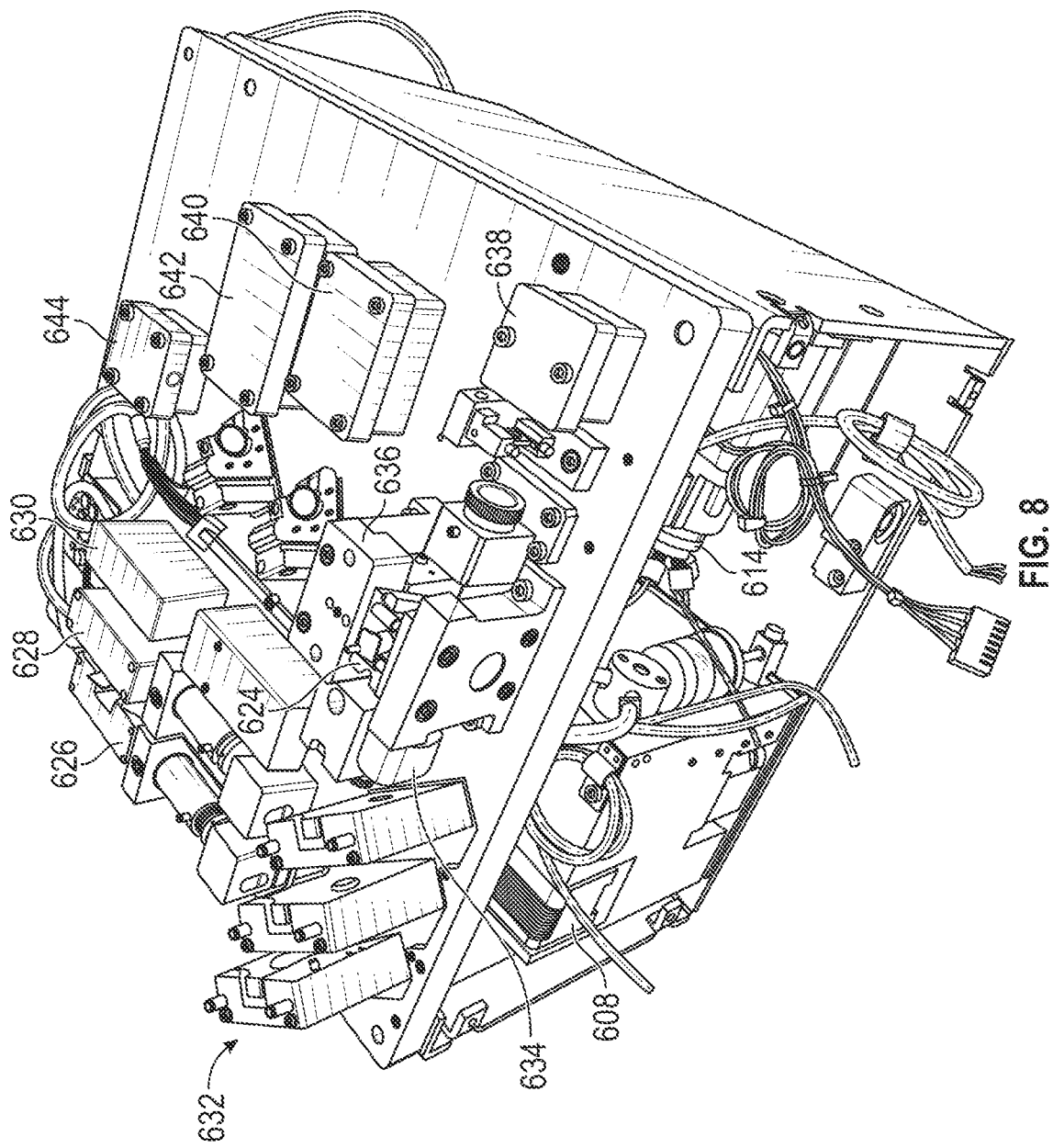
FIG. 8 is an internal, perspective view of optics and measurement systems of the flow cytometer of FIG. 6, according to some embodiments.

Referring now to FIG. 8, a perspective view of optics and measurement systems of flow cytometer 600 is shown, according to some embodiments. As shown, for example, the optics and measurement systems may be fastened (i.e., attached) to a single board or plate, which is then fastened above the fluidics systems described above, such as to a frame of flow cytometer 600. The optics and measurement systems shown may include any of the optics, sensors, lasers, etc., described above, for example. As with FIG. 7, it will be appreciated by those in the art that the particular layout, configuration, and type of components shown in FIG. 8 is not intended to be limiting, and that the components and layout may be modified, altered, or replaced in various other embodiments.

As shown, a flow cell 624 receives sheath fluid and a sample from the components of the fluidics systems described above. In other words, pumps 608-612 push sheath fluid and the sample to an inlet of flow cell 624, and the sheath fluid and sample are forced through flow cell 624 for testing. Flow cell 624 generally includes a cuvette which, as previously described, includes a flow channel for hydrodynamically focusing the suspended particles of the sample. In some embodiments, the flow channel may be substantially hourglass shaped, although any suitable type of cuvette may be used.

As a suspended particle passes through flow cell 624, which constitutes at least a portion of the examination zone, a plurality of lasers 626-630 irradiate the particle. In this example, a violet laser 626, a red laser 628, and a green laser 630 are shown. Those in the art will recognize that lasers 626-630 can include lasers or other light sources that emit any suitable range of wavelengths based on the type of analysis being conducted. Lasers 626-630 emit light that is reflected by a plurality of reflectors 632. In some embodiments, reflectors 632 include at least one dichroic reflector corresponding to each laser 626-630 (i.e., configured to reflect the respective laser wavelengths). Reflectors 632 reflect the laser light into a combination and focus lens 634, which combines and focuses the light for irradiating particles that pass through flow cell 624.

FIG. 8 further shows an objective lens 636 along a side of flow cell 624. Objective lens 636 may focus side-scatter light or emissions, as discussed above, for detection by one or more detectors 640-644. In this example, the detectors may include a violet detector 644, a red detector 642, and a green detector 640, corresponding to the wavelengths emitted by lasers 628-632. It will be appreciated, however, that other types of detectors (e.g., for other wavelengths) may be utilized when different color lasers are used. The system is also shown to include a forward scatter detector 638, which may include a lens for focusing and detecting forward emissions from an irradiated particle.

As described above with respect to FIG. 3, for example, the optics and measurement systems may also include a plurality of reflectors and/or filters (e.g., in addition to reflectors 632) for directing EMR from one or more EMR sources (e.g., lasers 626-630), directing scattered EMR and fluorescent emissions into detectors 638-644, filtering the scattered EMR and fluorescent emissions to increase measurement sensitivity and accuracy, etc. In some embodiments, the reflectors and/or filters includes at least one narrow band optical filter, as briefly described above and as described in greater detail below.

Figure 9:
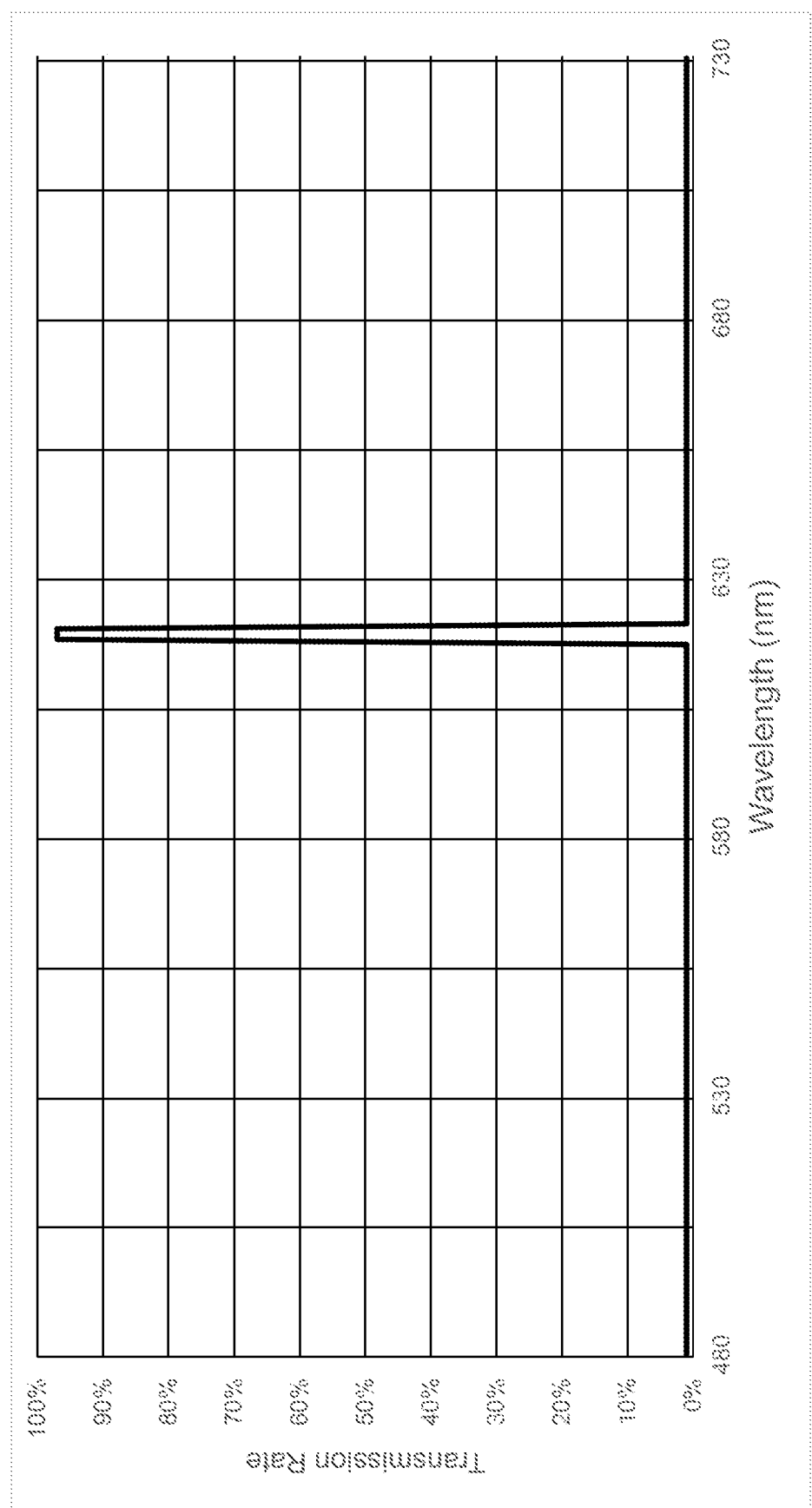
FIG. 9 is an example graph of the transmission rate of a narrow band optical filter with respect to wavelength, according to some embodiments.

Referring now to FIG. 9, an example graph of the transmission rate of a narrow band optical filter with respect to wavelength, according to some embodiments. The graph of FIG. 9 may represent the transmission rate of the narrow band optical filter (e.g., of optical system 326) described above with respect to FIG. 3, for example, and likewise may represent the transmission rate of one of the filters of the optics and measurement system described above with respect to FIG. 8. In some embodiments, the narrow band optical filter described herein is a roughly 10 mm square filter, constructed of glass, plastic, or any other suitable material.

As shown in FIG. 9, the narrow band optical filter is configured to transmit a majority of EMR (i.e., light) in a very narrow wavelength range. Specifically, the narrow band optical filter is configured to allow just a 1 to 2 nm range of wavelengths. In the example shown, the narrow band optical filter is configured to transmit roughly 98% of EMR at wavelengths between 618 and 620 nm, thereby expanding the dynamic range of the optical sensors (e.g., optical sensors 332 and/or detectors 638-644) by eliminating or removing EMR that is outside of the narrow band of 618-620 nm. Said narrow band optical filter can provide for an extended dynamic range of an optical signal over various other methods of extending the dynamic range, particularly for solid-state light sensors (e.g., CMOS). For example, in certain other systems, a signal may be split optically (e.g., using a reflective plate) or electrically. Each of these methods yields an extension of only 1.5 to 2 logs for the dynamic range of the signal. In contrast, the narrow band optical filter described herein can provide an extended dynamic range of approximately 6 logs when compared to a dynamic range of a system without said narrow band optical filter.

Figure 10A:
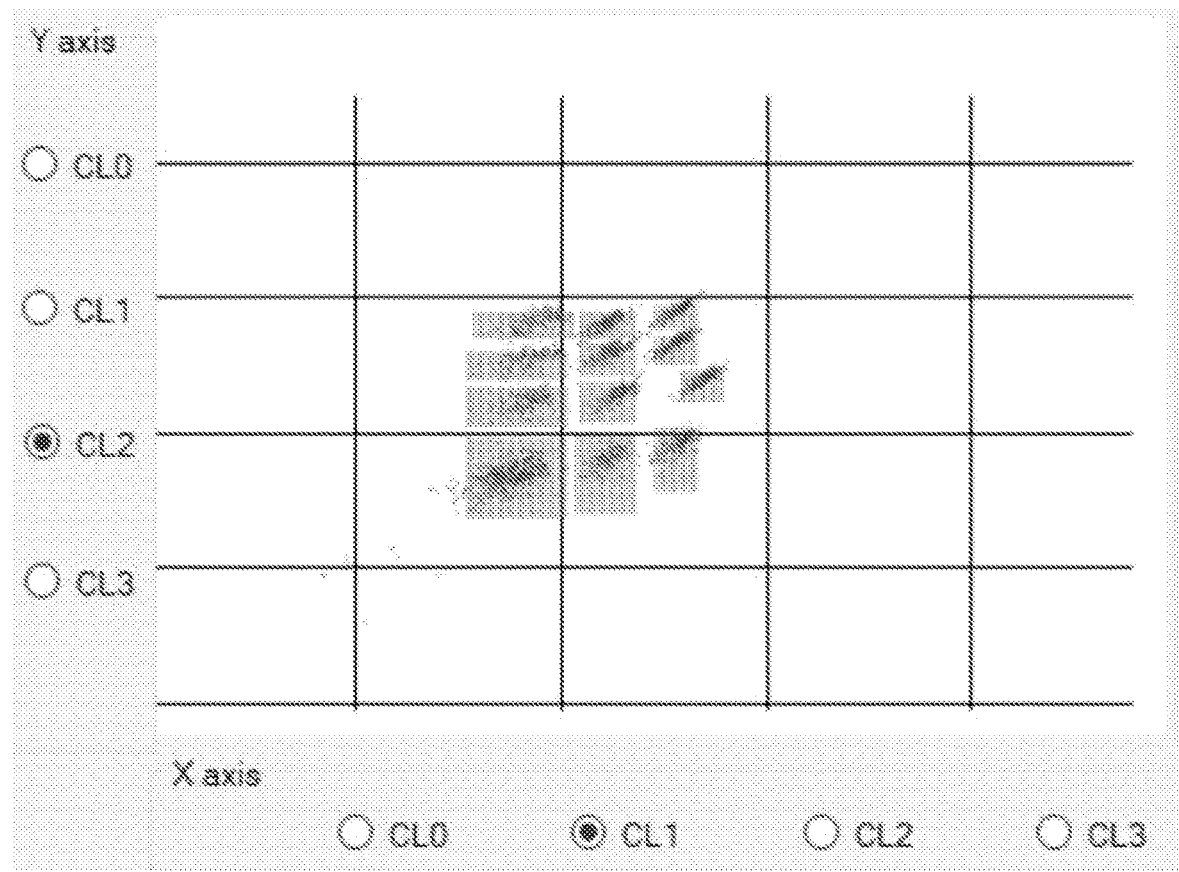
FIG. 10A is an illustration of ultralow background (ULGB) 12-plex magnetic field sensitive (MFS) microspheres displaying 12 distinct fluorescent signatures/emission regions, as detected by a flow instrument disclosed herein.

FIG. 10A is an illustration of ultralow background (ULGB) 12-plex magnetic field sensitive (MFS) microspheres displaying 12 distinct fluorescent signatures/emission regions, as detected by a flow instrument disclosed herein. These "dimly lit" ULGB microspheres contain a minimal amount of fluorescent dyes to minimize background signals, yet the disclosed flow instrument has the capacity to distinguish their unique fluorescent signatures. This result is a tribute to the disclosed flow instrument's superior sensitivity and wider/higher dynamic range.

Figure 10B:
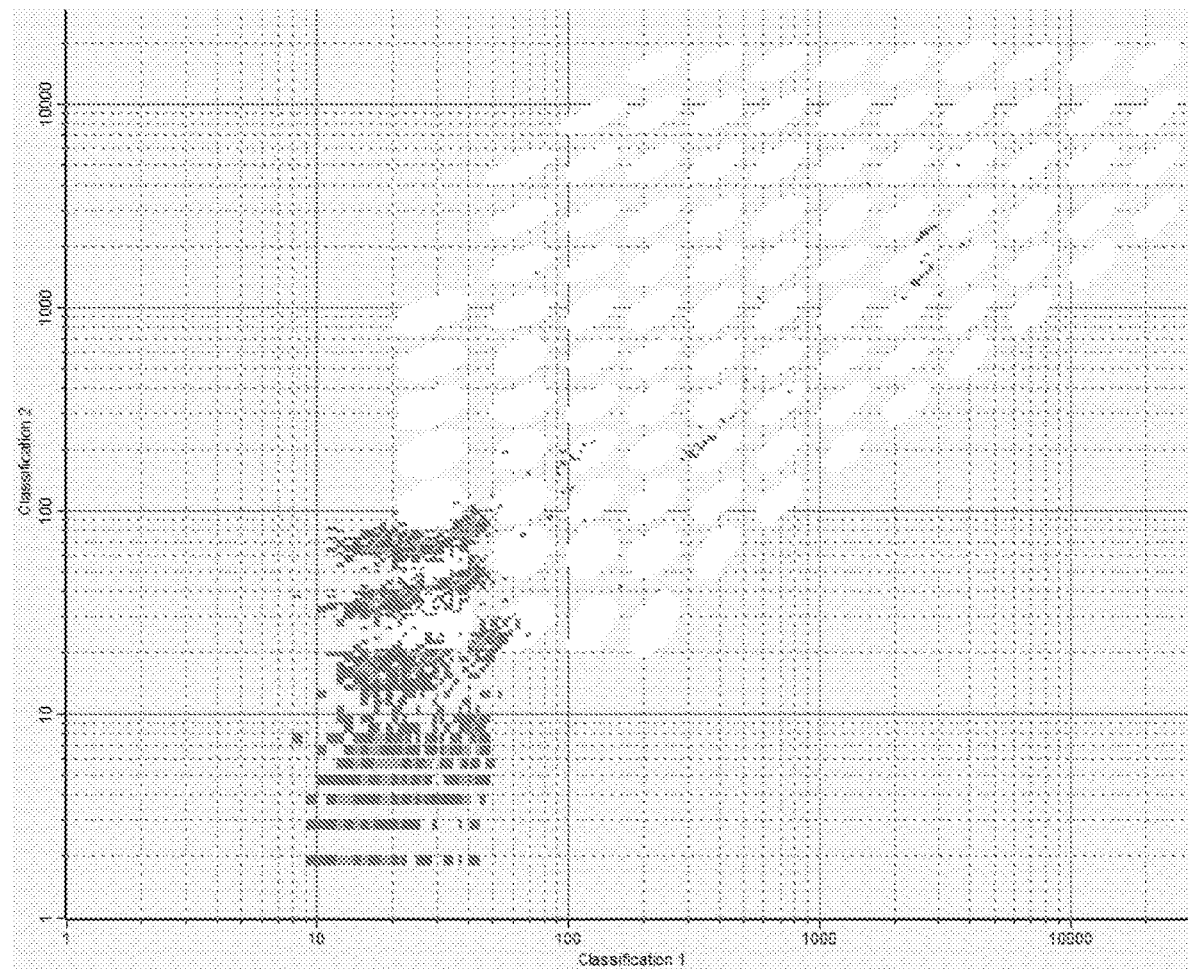
FIG. 10B is an illustration of the emission intensity output from a Luminex 100 flow instrument reading the same "dimly lit" ULGB 12-plex MFS microspheres.

FIG. 10B is an illustration of the emission intensity output from a Luminex 100 flow instrument reading the same "dimly lit" ULGB 12-plex MFS microspheres; notice that the 12 distinct fluorescent signatures are illegible, largely due to the Luminex 100's limitations in detecting emission intensities from microspheres dyed with very low concentrations of fluorescent dyes.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of capturing fluorescent emission intensity or light scatter attributable to an irradiated fluorescent-dyed particle passing through an examination zone, the method comprising:
   irradiating a particle dyed with one or more fluorescent dyes passing through an examination zone with electromagnetic radiation comprising one or more preselected wavelengths; and
   capturing one or more fluorescent emission intensities or light scatter attributable to said one or more fluorescent dyes;
   wherein the particle dyed with said one or more fluorescent dyes passes through the examination zone transported by a sheath fluid that is delivered in characteristic pulses by a syringe pump driven by a stepper motor, wherein said capturing step comprises sampling said one or more fluorescent emission intensities or light scatter at a capturing rate that varies in a phase-locked manner with the characteristic pulses of the sheath fluid delivery, and wherein the method comprises:
   measuring an amplitude of the characteristic pulses to provide a peak and a trough of the measured amplitude,
   synchronizing a clock or high speed counter with the capturing rate, and
   varying the capturing rate to increase the capturing rate at the peak of the measured amplitude and to decrease the capturing rate at the trough of the measured amplitude.

2. The method of claim 1, wherein the characteristic pulses of the sheath fluid delivery result in a constant acceleration and deceleration of sheath fluid passing through the examination zone.

3. The method of claim 1, wherein the phase-locked manner is further characterized as increasing the capturing rate as said particle dyed with said one or more fluorescent dyes accelerates and decreasing the capturing rate as said particle dyed with said one or more fluorescent dyes decelerates through the examination zone.

4. The method of claim 1, wherein said examination zone comprises one or more examination compartments, each compartment dedicated to irradiation of said particle dyed with said one or more fluorescent dyes by electromagnetic radiation having a preselected wavelength.

5. The method of claim 1, wherein the one or more fluorescent emission intensities are captured by capturing a number of photons having wavelengths falling within a predetermined band.

6. The method of claim 1, wherein the phase-locked manner is further characterized as increasing and decreasing the capturing rate in direct proportion to the increase and decrease of the velocity of said particle dyed with said one or more fluorescent dyes as it passes through the examination zone.

7. The method of claim 1, wherein the amplitude is measured using a pressure sensor, variations in time of flight, or a combination thereof.

8. The method of claim 1, wherein the maximum and minimum capturing rates are proportional to the measured amplitude.

9. A flow instrument for multiplexed analysis of a pooled population of subsets of particles exposed to a sample, the flow instrument comprising:
   an examination zone comprising one or more examination compartments, each examination compartment dedicated to irradiation of a particle passing through the examination zone by electromagnetic radiation having a preselected wavelength;
   one or more electromagnetic radiation sources for directing electromagnetic radiation at the examination zone and irradiating a passing particle;
   one or more detectors configured to detect electromagnetic radiation emitted or scattered by the passing particle;
   a syringe pump driven by a stepper motor to deliver when actuated sheath fluid in characteristic pulses according to each advance taken by the stepper motor for transporting the passing particle; and
   a controller, including a processing circuit configured to execute instructions stored on a computer-readable medium, which cause the controller to:
   actuate the syringe pump to deliver sheath fluid to transport the passing particle, capture the detected electromagnetic radiation emitted or scattered by the passing particle at a capturing rate commensurate with the velocity of the transported particle as it passes through the examination zone, and compile information about the captured electromagnetic radiation emitted or scattered by the passing particle, wherein the instructions further cause the controller to:
measure an amplitude of the characteristic pulses to provide a peak and a trough of the measured amplitude, synchronize a clock or high speed counter with the capturing rate, and vary the capturing rate to increase the capturing rate at the peak of the measured amplitude and to decrease the capturing rate at the trough of the measured amplitude.

10. The flow instrument of claim 9, wherein the flow instrument is configured to measure the amplitude using a pressure sensor, variations in time of flight, or a combination thereof.

11. The flow instrument of claim 9, wherein a maximum capturing rate and a minimum capturing rate are proportional to the measured amplitude.

12. The flow instrument of claim 9, wherein the capturing rate increases and decreases in direct proportion to an increase and a decrease of the velocity of the passing particle.

13. The flow instrument of claim 9, wherein the information compiled comprises a row and a column of a plate comprising a plurality of sample wells from which the passing particle originated.

14. The flow instrument of claim 9, wherein the information compiled includes a region in fluorescent space in which the captured electromagnetic radiation emitted or scattered by the passing particle falls.

15. The flow instrument of claim 9, wherein the information compiled includes a median fluorescent intensity of the captured electromagnetic radiation emitted or scattered by the passing particle.

16. The flow instrument of claim 9, wherein the information compiled includes a trimmed mean fluorescent intensity of the captured electromagnetic radiation emitted or scattered by the passing particle.

17. The flow instrument of claim 9, further comprising a sample tray that can accommodate a 96-well plate, a 384-well plate, or one or more individual Eppendorf tubes.

18. The flow instrument of claim 17, further comprising: (i) a sample probe that is coupled to the stepper motor, and (ii) an infrared proximity sensor, which, together with the sample probe, provides control over the displacement of the sample probe in a plate well or Eppendorf tube.

19. The flow instrument of claim 18, wherein the sample probe has physical dimensions that allow the sample probe to displace less sample fluid.

20. The flow instrument of claim 19, wherein the sample probe comprises a hollow tube having an outer diameter of about 1/32 of an inch and protruding by about 1/4 inches from an outer jacket having an outer diameter of about 1/16 of an inch.

21. The flow instrument of claim 19, wherein the sample probe exhibits a surface area that is between about 5% to about 10% that of past probes, providing less sample carryover from well to well.

22. The flow instrument of claim 17, further comprising an internal bar code reader.

23. The flow instrument of claim 22, wherein the internal bar code reader validates that a given plate or Eppendorf tube placed on the sample tray is correct.

24. The flow instrument of claim 17, wherein the sample tray is side-loaded.

25. The flow instrument of claim 17, which further comprises a built-in ultraviolet C (UVC) lamp and ozone generator capable of bathing the sample tray and proximal area with sanitizing electromagnetic radiation and/or ozone.

26. The flow instrument of claim 9, further comprising a thin-wall cuvette, which accommodates a high numerical aperture objective lens that provides greater sensitivity.

27. The flow instrument of claim 9, further comprising an internal camera.

28. The flow instrument of claim 27, wherein the internal camera validates proper machine function when running or reading an assay, doubles as a remote diagnostic tool, or both.

29. The flow instrument of claim 9, further comprising a fluid port for accommodating a cleaning solution, thus supporting automatic cleaning cycles.

30. The flow instrument of claim 29, which further comprises one or more bubble detectors that trigger a warning when the sheath fluid, cleaning solution, or both are empty or nearly empty.

31. The flow instrument of claim 30, wherein the controller is configured to automatically recover from the warning.

32. The flow instrument of claim 9, further comprising an automatic laser alignment system.

33. The flow instrument of claim 32, wherein the automatic laser alignment system is capable of aligning one or more internal optical components to within 1 μrad.

34. The flow instrument of claim 9, wherein the syringe pump is capable of dislodging clogs.

35. The flow instrument of claim 9, further comprising secure WiFi and Ethernet ports that connect to a network.

36. The flow instrument of claim 9, further comprising an application program interface (API) comprising JavaScript object notation (JSON) inputs and outputs that communicate with a lab information system.

37. The flow instrument of claim 9, which further comprises a narrow band optical filter that allows a 1-2 nm band of light to pass through the filter.

38. The flow instrument of claim 37, wherein the band of light that passes though the filter comprises wavelengths of about 618-620 nm.

39. The flow instrument of claim 37, wherein the narrow band optical filter provides for an extended dynamic range of the optical signal that is about 6 logs compared to a dynamic range in an absence of the narrow band optical filter.

40. A flow instrument for multiplexed analysis of a pooled population of subsets of particles exposed to a sample, the flow instrument comprising:
an examination zone comprising one or more examination compartments, each examination compartment dedicated to irradiation of a particle passing through the examination zone by electromagnetic radiation having a preselected wavelength;
one or more electromagnetic radiation sources for directing electromagnetic radiation at the examination zone and irradiating a passing particle;
one or more detectors configured to detect electromagnetic radiation emitted or scattered by the passing particle;

a syringe pump driven by a stepper motor to deliver, when actuated, sheath fluid in characteristic pulses according to each advance taken by the stepper motor for transporting the passing particle;

a sample tray that can accommodate a 96-well plate, a 384-well plate, or one or more individual Eppendorf tubes;

a sample probe that is coupled to the stepper motor, wherein the sample probe has physical dimensions that allow the sample probe to displace less sample fluid, and wherein the sample probe exhibits a surface area that is between about 5% to about 10% that of past probes, providing less sample carryover from well to well;

an infrared proximity sensor, which, together with the sample probe, provide control over the displacement of the sample probe in a plate well or Eppendorf tube; and a controller, including a processing circuit configured to execute instructions stored on a computer-readable medium, which cause the controller to:
  actuate the syringe pump to deliver sheath fluid to transport the passing particle,
  capture the detected electromagnetic radiation emitted or scattered by the passing particle at a capturing rate commensurate with a velocity of the transported particle as it passes through the examination zone, and
  compile information about the captured electromagnetic radiation emitted or scattered by the passing particle.

* * * * *